(12) United States Patent
Chang et al.

(10) Patent No.: US 10,073,307 B1
(45) Date of Patent: Sep. 11, 2018

(54) LIQUID CRYSTAL DISPLAY PANEL COMPRISING FIRST, SECOND, AND THIRD SUB-PIXELS AND FIRST AND SECOND CONTROL ELECTRODES HAVING DIFFERENT POLARITIES

(71) Applicant: Au Optronics Corporation, Hsinchu (TW)

(72) Inventors: Wan-Heng Chang, Hsinchu (TW); Sung-Yu Su, Tainan (TW)

(73) Assignee: Au Optronics Corporation, Hsinchu, Taiwan (CN)

( * ) Notice: Subject to any disclaimer, the term of this patent is extended or adjusted under 35 U.S.C. 154(b) by 0 days.

(21) Appl. No.: 15/802,389

(22) Filed: Nov. 2, 2017

(30) Foreign Application Priority Data

Aug. 25, 2017  (TW) .............................. 106128943 A

(51) Int. Cl.
*G02F 1/1343* (2006.01)

(52) U.S. Cl.
CPC .................. *G02F 1/134336* (2013.01); *G02F 2001/134345* (2013.01)

(58) Field of Classification Search
CPC .................. G02F 1/0316; G02F 1/155; G02F 2001/1357; G02F 2001/136218; G02F 2201/122; G09G 2300/0421
See application file for complete search history.

(56) References Cited

U.S. PATENT DOCUMENTS

| | | | |
|---|---|---|---|
| 6,285,431 B2 | 9/2001 | Lyu et al. | |
| 6,646,707 B2 | 11/2003 | Noh et al. | |
| 7,859,630 B2 | 12/2010 | Wakabayashi | |
| 8,988,643 B2 | 3/2015 | Yang et al. | |
| 9,058,782 B2 | 6/2015 | Fan et al. | |
| 2004/0227890 A1* | 11/2004 | Chung et al. | G02F 1/1343 349/141 |

(Continued)

FOREIGN PATENT DOCUMENTS

| | | |
|---|---|---|
| CN | 103091883 | 5/2013 |
| CN | 103257487 | 8/2013 |

(Continued)

*Primary Examiner* — Paul Lee
(74) *Attorney, Agent, or Firm* — JCIPRNET

(57) ABSTRACT

A liquid crystal display panel including first and second substrates, a sub-pixel row, first and second control electrodes is provided. The sub-pixel row is disposed on the first substrate and includes first, second and third sub-pixels arranged in sequence along a first direction, the polarity of the first sub-pixel and the polarity of third sub-pixel are the same, the polarity of the second sub-pixel is different from the polarities of the first and third sub-pixels, each of the first to third sub-pixels has a first region and a second region arranged along a second direction, and includes an electrode having a first slit pattern and a second slit pattern respectively located in the first region and the second region, wherein the extending direction of the first slit pattern is different from that of the second slit pattern, and the extending directions of the first slit patterns of two adjacent electrodes are different. The first and second control electrodes having different polarities are disposed on the second substrate and respectively overlap the first and the second regions.

13 Claims, 9 Drawing Sheets

(56) References Cited

U.S. PATENT DOCUMENTS

| | | | |
|---|---|---|---|
| 2005/0099573 A1* | 5/2005 | Kubo et al. | G02F 1/1343 349/146 |
| 2005/0225708 A1* | 10/2005 | Oke et al. | G02F 1/1343 349/139 |
| 2009/0091696 A1* | 4/2009 | Higano | G02F 1/1337 349/126 |
| 2009/0128726 A1* | 5/2009 | Tanno | G02F 1/134363 349/43 |
| 2010/0207862 A1* | 8/2010 | Xu et al. | G09G 3/36 349/90 |
| 2011/0170027 A1* | 7/2011 | Nakanishi et al. | G02F 1/133 349/33 |
| 2014/0063386 A1 | 3/2014 | Yang et al. | |
| 2014/0192091 A1 | 7/2014 | Fan et al. | |
| 2017/0255041 A1 | 9/2017 | Chang et al. | |

FOREIGN PATENT DOCUMENTS

| | | |
|---|---|---|
| CN | 105652532 | 6/2016 |
| JP | 2010175865 | 8/2010 |

\* cited by examiner

US 10,073,307 B1

LIQUID CRYSTAL DISPLAY PANEL COMPRISING FIRST, SECOND, AND THIRD SUB-PIXELS AND FIRST AND SECOND CONTROL ELECTRODES HAVING DIFFERENT POLARITIES

CROSS-REFERENCE TO RELATED APPLICATION

This application claims the priority benefit of Taiwan application serial no. 106128943, filed on Aug. 25, 2017. The entirety of the above-mentioned patent application is hereby incorporated by reference herein and made a part of this specification.

BACKGROUND OF THE INVENTION

Field of the Invention

The invention is related to a display panel, and particularly to a liquid crystal display panel.

Description of Related Art

In order to prevent that highly confidential data is peeped by someone else, existing display apparatuses that have privacy protection function are designed in the manner that privacy is protected in all viewing angles except the normal viewing angle. In other words, an image cannot be seen clearly by user in any other viewing angles except the normal viewing angle. However, the above-mentioned wide viewing angle does not selectively have a privacy protection effect at a specific viewing angle, and thus the commercial application thereof is restricted.

SUMMARY OF THE INVENTION

The invention provides a liquid crystal display panel which has a privacy protection effect at a specific viewing angle.

The invention provides a liquid crystal display panel which selectively has a privacy protection effect at a specific viewing angle.

In an embodiment of the invention, a liquid crystal display panel includes a first substrate, a second substrate, a liquid crystal layer, a first sub-pixel row, a first control electrode and a second control electrode. The second substrate is opposite to the first substrate. The liquid crystal layer is disposed between the first substrate and the second substrate. The first sub-pixel row is disposed on the first substrate and includes a first sub-pixel, a second sub-pixel and a third sub-pixel arranged in sequence along a first direction. A polarity of the first sub-pixel is the same as a polarity of the third sub-pixel. A polarity of the second sub-pixel is different from the polarity of the first sub-pixel and the polarity of the third sub-pixel. Each of the first sub-pixel, the second sub-pixel and the third sub-pixel has a first region and a second region arranged along a second direction. The first direction intersects with the second direction. Each of the first sub-pixel, the second sub-pixel and the third sub-pixel includes a first electrode, wherein each of the first electrodes has at least one first slit pattern and at least one second slit pattern. At least one first slit pattern is disposed in the first region. At least one second slit pattern is disposed in the second region. An extending direction of the at least one first slit pattern is different from an extending direction of the at least one second slit pattern. Moreover, in the first direction, the extending directions of the at least one first slit pattern of two adjacent first electrodes are different. A first control electrode is disposed on the second substrate and overlaps the first region of the first sub-pixel, the first region of the second sub-pixel and the first region of the third sub-pixel. A second control electrode is disposed on the second substrate and overlaps the second region of the first sub-pixel, the second region of the second sub-pixel and the second region of the third sub-pixel, wherein a polarity of the first control electrode is different from a polarity of the second control electrode.

In an embodiment of the invention, the liquid crystal display panel includes a first substrate, a second substrate, a liquid crystal layer, a first sub-pixel row, a second sub-pixel row, a first control electrode and a second control electrode. The second substrate is opposite to the first substrate. The liquid crystal layer is disposed between the first substrate and the second substrate. The first sub-pixel row is disposed on the first substrate and includes a first sub-pixel, a second sub-pixel and a third sub-pixel arranged in sequence along a first direction. A polarity of the first sub-pixel is the same as a polarity of the third sub-pixel. A polarity of the second sub-pixel is different from the polarity of the first sub-pixel and the polarity of the third sub-pixel. Each of the first sub-pixel, the second sub-pixel and the third sub-pixel includes a first electrode, wherein each of the first electrodes has at least one slit pattern. In the first direction, the extending directions of the at least one slit pattern of two adjacent first electrodes are different. The second sub-pixel row is disposed on the first substrate and includes a fourth sub-pixel, a fifth sub-pixel and a sixth sub-pixel arranged in sequence along the first direction. A polarity of the fourth sub-pixel is the same as a polarity of the sixth sub-pixel. A polarity of the fifth sub-pixel is different from the polarity of the fourth sub-pixel and the polarity of the sixth sub-pixel. Each of the fourth sub-pixel, the fifth sub-pixel and the sixth sub-pixel includes the first electrode, wherein the fourth sub-pixel and the first sub-pixel are arranged in a second direction. The first direction intersects with the second direction, and the polarity of the fourth sub-pixel is different from the polarity of the first sub-pixel. The first control electrode is disposed on the second substrate and overlaps the first sub-pixel, the second sub-pixel and the third sub-pixel. The second control electrode is disposed on the second substrate and overlaps the fourth sub-pixel, the fifth sub-pixel and the sixth sub-pixel, wherein a polarity of the first control electrode is different from a polarity of the second control electrode.

In summary, according to an embodiment of the invention, the liquid crystal display panel can achieve the privacy protection effect at a specific viewing angle with the design that the polarity of the first sub-pixel is the same as the polarity of the third sub-pixel, the polarity of the second sub-pixel is different from the polarity of the first sub-pixel and the polarity of the third sub-pixel, the polarity of the first control electrode is different from the polarity of the second control electrode, the extending direction of at least one first slit pattern is different from the extending direction of at least one second slit pattern, and in the first direction, the extending directions of at least one first slit pattern of any two adjacent ones of the first sub-pixel, the second sub-pixel and the third sub-pixel are different from each other; or with the design that the polarity of the first sub-pixel is the same as the polarity of the third sub-pixel, the polarity of the second sub-pixel is different from the polarity of the first sub-pixel and the polarity of the third sub-pixel, the polarity of the fourth sub-pixel is the same as the polarity of the sixth sub-pixel, the polarity of the fifth sub-pixel is different from the polarity of the fourth sub-pixel and the polarity of the sixth sub-pixel, the polarity of the fourth sub-pixel is different from the polarity of the first sub-pixel, the polarity of the first control electrode is different from the polarity of the second control electrode, and in the first direction, the extending directions of the at least one slit pattern of any two adjacent ones of the first sub-pixel, the second sub-pixel, the third sub-pixel, the fourth sub-pixel, the fifth sub-pixel and the sixth sub-pixel are different from each other.

In order to make the aforementioned features and advantages of the invention more comprehensible, embodiments accompanying figures are described in detail below.

DESCRIPTION OF EMBODIMENTS

Figure 1:
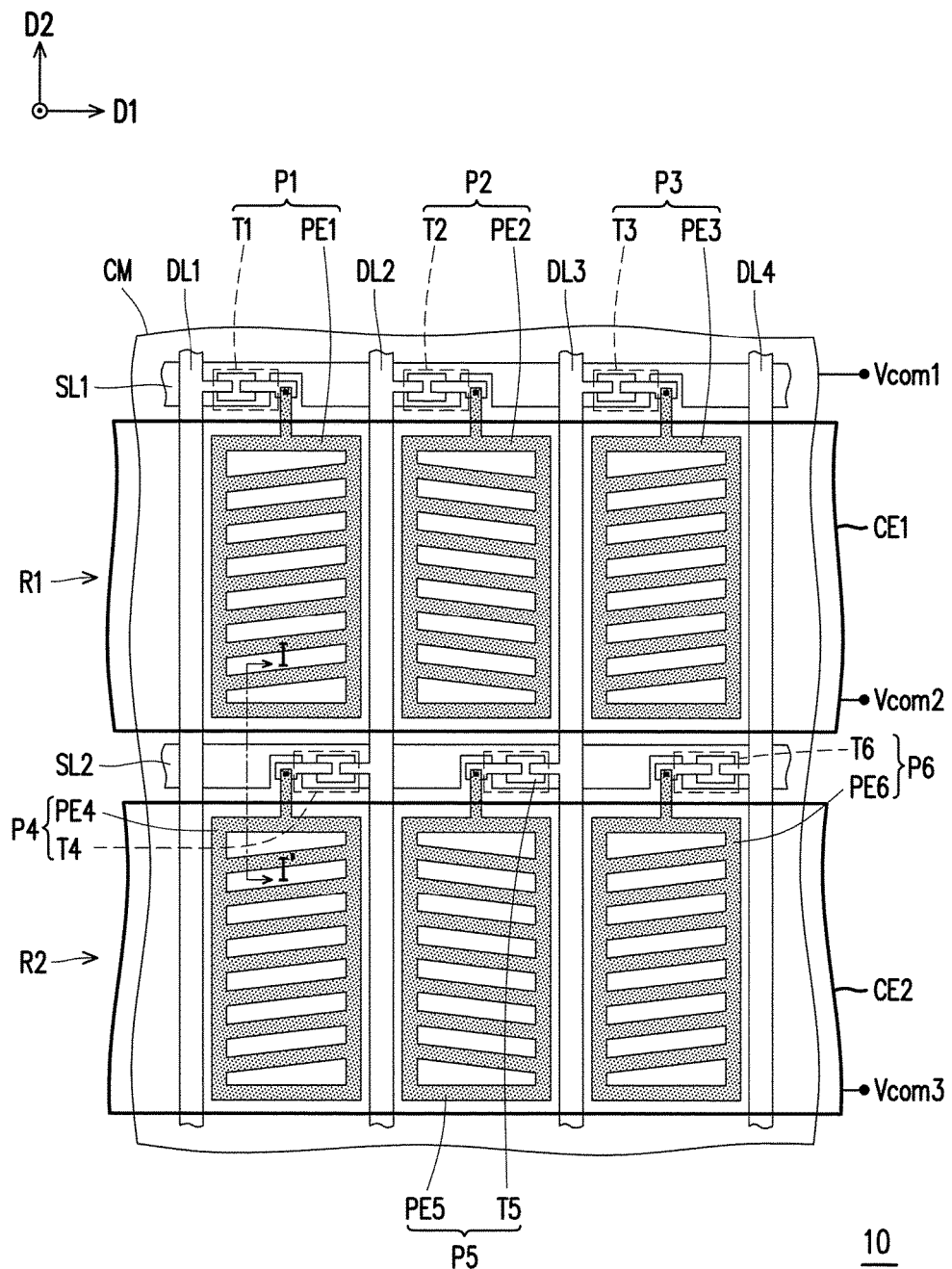
FIG. 1 is a top view illustrating a liquid crystal display panel according to a first embodiment of the invention.
Figure 2:
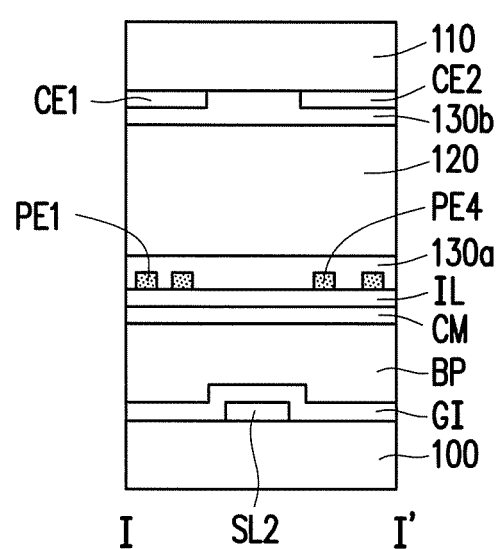
FIG. 2 is a cross-sectional view taken along line I-I' of FIG. 1.
Figure 3:
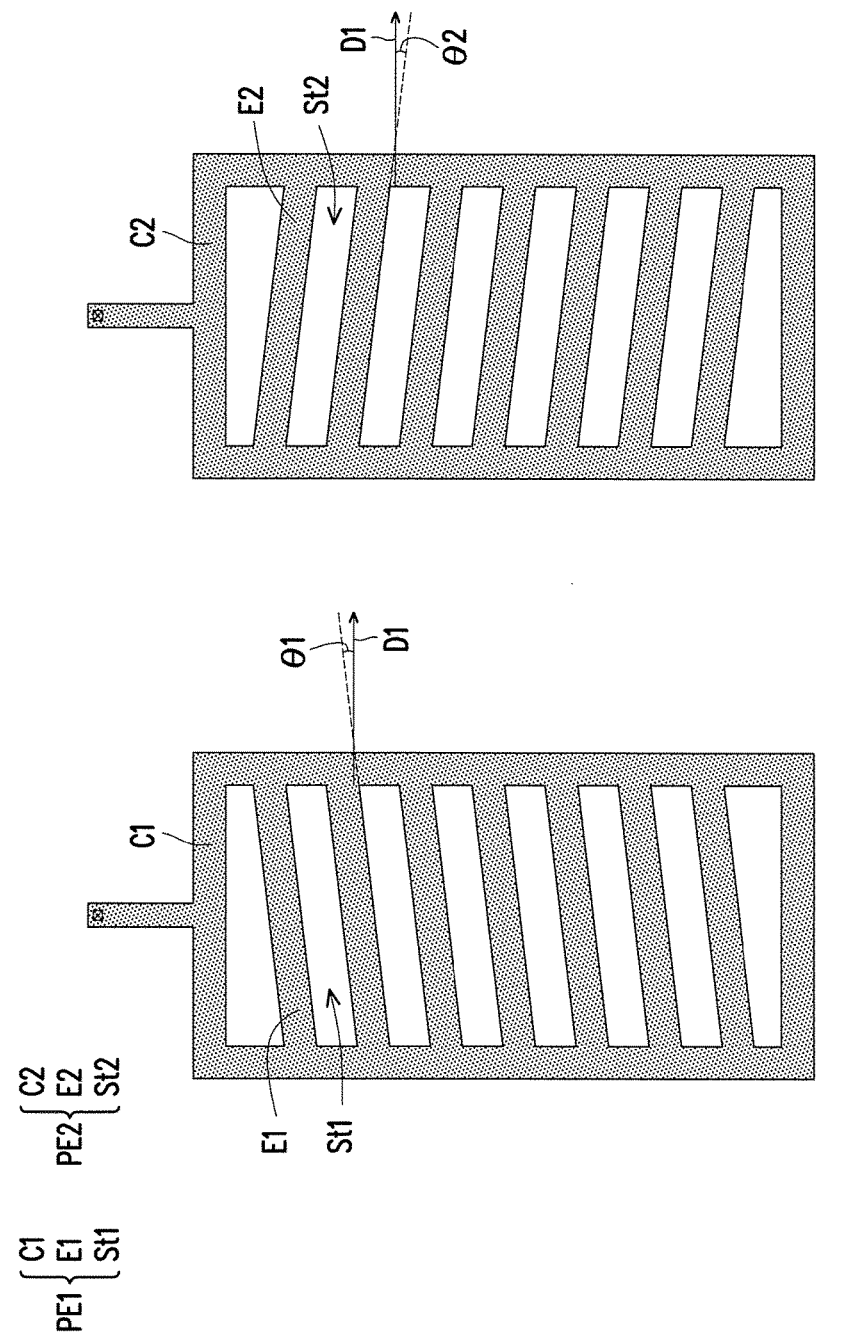
FIG. 3 is an enlarged top view illustrating a first electrode PE1 and a second electrode PE2 in FIG. 1.

FIG. 1 is a top view illustrating a liquid crystal display panel according to a first embodiment of the invention. FIG. 2 is a cross-sectional view taken along line I-I' of FIG. 1. FIG. 3 is an enlarged top view illustrating a first electrode PE1 and a first electrode PE2 in FIG. 1.

Referring to FIG. 1 to FIG. 3, a liquid crystal display panel 10 includes a first substrate 100, a second substrate 110, a liquid crystal layer 120, a first sub-pixel row R1, a second sub-pixel row R2, a first control electrode CE1 and a second control electrode CE2. In addition, the liquid crystal display panel 10 may further include scan line SL1, scan line SL2, data line DL1, data line DL2, data line DL3, data line DL4, insulating layer GI, protecting layer BP, common electrode layer CM, interlayered insulating layer IL, alignment film 130a and alignment film 130b. For clearer descriptions, the illustration of FIG. 1 does not show the first substrate 100, the second substrate 110, the liquid crystal layer 120, the insulating layer GI, the protecting layer BP, the interlayered insulating layer IL, the alignment film 130a and the alignment film 130b.

The material of the first substrate 100 may be glass, quartz or organic polymer. The second substrate 110 is opposite to the first substrate 100. The material of the second substrate 100 may be glass, quartz or organic polymer.

The liquid crystal layer 120 is disposed between the first substrate 100 and the second substrate 110. In the embodiment, the liquid crystal molecules of the liquid crystal layer 120 may be a positive liquid crystal molecule, and a longitudinal axis thereof is parallel with an electric field direction when being driven by the electric field.

The scan lines SL1, SL2, the data lines DL1, DL2, DL3 and DL4 are disposed on the first substrate 100. The extending direction of the scan lines SL1 and SL2 is different from the extending direction of the data lines DL1, DL2, DL3 and DL4. Preferably, the extending direction of the scan lines SL1 and SL2 is perpendicular to the extending direction of the data lines DL1, DL2, DL3 and DL4. In the embodiment, the extending direction of the scan lines SL1 and SL2 is a first direction D1, and the extending direction of the data lines DL1, DL2, DL3 and DL4 is a second direction D2, wherein the first direction D1 and the second direction D2 are perpendicular to each other, that is, the first direction D1 intersects the second direction D2.

In addition, the scan lines SL1, SL2 and the data lines DL1, DL2, DL3 and DL4 may be disposed on different layers, and the insulating layer GI may be sandwiched between the scan lines SL1, SL2 and the data lines DL1, DL2, DL3 and DL4. In consideration of conductivity, the scan liens SL1, SL2 and the data lines DL1, DL2, DL3 and DL4 are generally formed of metal material, which should not be construed as a limitation to the invention. According to other embodiments, the scan lines SL1, SL2 and the data lines DL1, DL2, DL3 and DL4 may be formed of other conductive materials such as alloy, nitride of metal material, oxide of metal material, oxynitride of metal material and so on, or stacked layer of metal material and the aforesaid conductive materials. In addition, the material of the insulating layer GI may be an inorganic material, an organic material or a combination thereof, wherein the inorganic material is, for example, silicon oxide, silicon nitride, silicon oxynitride, or a stacked layer of at least two materials mentioned above; the organic material is polymer material such as a polyimide-based resin, an epoxy-based resin or an acrylic-based resin.

The first sub-pixel row R1 is disposed on the first substrate 100 and includes a first sub-pixel P1, a second sub-pixel P2 and a third sub-pixel P3 arranged in sequence along the first direction D1. The second sub-pixel row R2 is disposed on the first substrate 100 and includes a fourth sub-pixel P4, a fifth sub-pixel P5 and a sixth sub-pixel P6 arranged in sequence along the first direction D1. In the embodiment, the first sub-pixel P1 and the fourth sub-pixel P4 are arranged in sequence along the second direction D2. In addition, in the embodiment, the first sub-pixel P1 is electrically connected with the scan line SL1 and the data line DL1. The second sub-pixel P2 is electrically connected with the scan line SL1 and the data line DL2. The third sub-pixel P3 is electrically connected with the scan line SL1 and the data line DL3. The fourth sub-pixel P4 is electrically connected with the scan line SL2 and the data line DL2. The fifth sub-pixel P5 is electrically connected with the scan line SL2 and the data line DL3. The sixth sub-pixel P6 is electrically connected with the scan line SL2 and the data line DL4.

In the embodiment, the polarity of the first sub-pixel P1 is the same as the polarity of the third sub-pixel P3. The polarity of the second sub-pixel P2 is different from the polarity of the first sub-pixel P1 and the polarity of the third sub-pixel P3. The polarity of the fourth sub-pixel P4 is the same as the polarity of the sixth sub-pixel P6. The polarity of the fifth sub-pixel P5 is different from the polarity of the fourth sub-pixel P4 and the polarity of the sixth sub-pixel P6. The polarity of the fourth sub-pixel P4 is different from the polarity of the first sub-pixel P1. Each data line inputs corresponding data voltage or signal to a corresponding sub-pixel such that each sub-pixel exhibits the required display effect. In other words, in the embodiment, the voltage polarity received by the data line D1 and the voltage polarity received by the data line D3 are the same. The voltage polarity received by the data line DL2 and the voltage polarity received by the data line DL4 are the same. The voltage polarity received by the data line DL2 and the voltage polarity received by the data line DL4 are different from the voltage polarity received by the data line DL1. The voltage polarity received by the data line DL2 and the voltage polarity received by the data line DL4 are different from the voltage polarity received by the data line DL3. For example, in an embodiment, when the first sub-pixel P1, the second sub-pixel P2, the third sub-pixel P3, the fourth sub-pixel P4, the fifth sub-pixel P5 and the sixth sub-pixel P6 are operated or driven, in the same time period, the data line DL1 and the data line DL3 receive a positive voltage, and the data line DL2 and the data line DL4 receive a negative voltage. In the descriptions, the negative voltage received by the data line is defined as a situation that the voltage of the data line is substantially smaller than the voltage of a common electrode layer CM (detailed descriptions are incorporated in the following passage). Meanwhile, the positive voltage received by the data line is defined as a situation that the voltage of the data line is substantially larger than the voltage of the common electrode layer CM (detailed descriptions are incorporated in the following passage).

In the embodiment, the first sub-pixel P1 includes a first electrode PE1, the second sub-pixel P2 includes a first electrode PE2, the third sub-pixel P3 includes a first electrode PE3, the fourth sub-pixel P4 includes a first electrode PE4, the fifth sub-pixel P5 includes a first electrode PE5, and the sixth sub-pixel P6 includes a first electrode PE6. Each of the first electrodes PE1, PE2, PE3, PE4, PE5 and PE6 is, for example, a transparent conductive layer, and the material thereof includes a metal oxide conductive material such as indium tin oxide, indium zinc oxide, aluminum tin oxide, aluminum zinc oxide, indium germanium zinc oxide, or other suitable oxide, or a stacked layer of at least two materials mentioned above.

Referring to FIG. 1 and FIG. 3, the first electrode PE1 includes a frame C1 and branches E1 connected with the frame C1, wherein a slit pattern St1 is formed between two adjacent branches E1, and the first electrode PE2 includes a frame C2 and branches E2 connected with the frame C2, wherein a slit pattern St2 is formed between two adjacent branches E2. In other words, in the embodiment, the first electrode PE1 and the first electrode PE2 are patterned electrodes.

In the embodiment, an included angle θ1 between an extending direction of each slit pattern St1 of the first electrode PE1 and the first direction D1 is larger than 0 degree and smaller than or equal to 45 degrees. An included angle θ2 between an extending direction of each slit pattern St2 of the first electrode PE2 and the first direction D1 is larger than 0 degree and smaller than or equal to 45 degrees. Additionally, in the descriptions, the first direction D1 serves as the basis, the included angle θ1 between the extending direction of each slit pattern St1 of the first electrode PE1 and the first direction D1 is defined as a positive angle, and the included angle θ2 between the extending direction of each slit pattern St2 of the first electrode PE2 and the first direction D1 is defined as a negative angle. That is to say, in the embodiment, the extending direction of each slit pattern St1 of the first electrode PE1 is different from the extending direction of each slit pattern St2 of the first electrode PE2. In this manner, when being driven by the electric field, the deflection direction of the liquid crystal molecule in the liquid crystal layer 120 corresponding to the first electrode PE1 is opposite to the deflection direction of the liquid crystal molecule in the liquid crystal layer 120 corresponding to the first electrode PE2.

Moreover, as shown in FIG. 1, in the embodiment, the first electrodes PE3, PE4, PE6 have the same construction as the first electrode PE1, and the first electrode PE5 has the same construction as the first electrode PE2. Based on the above, according to the descriptions regarding the first electrode PE1 and the first electrode PE2, persons of ordinary skill in the art should be able to understand the detailed structure of the first electrodes PE3, PE4, PE5 and PE6; therefore, no further descriptions are incorporated herein. Furthermore, according to the descriptions regarding the first electrode PE1 and the first electrode PE2, persons of ordinary skill in the art should be able to understand that the extending direction of each slit pattern of the first electrode PE3 is different from the extending direction of each slit pattern St2 of the first electrode PE2, the extending direction of each slit pattern of the first electrode PE4 is different from the extending direction of each slit pattern of the first electrode PE5, and the extending direction of each slit pattern of the first electrode PE6 is different from the extending direction of each slit pattern of the first electrode PE5. In other words, in the embodiment, in the first direction D1, the extending directions of the slit patterns of any two adjacent first electrodes are different from each other.

In the embodiment, the first sub-pixel P1 further includes an active element T1, the second sub-pixel P2 further includes an active element T2, the third sub-pixel P3 further includes an active element T3, the fourth sub-pixel P4 further includes an active element T4, the fifth sub-pixel P5 further includes an active element T5, the sixth sub-pixel P6 further includes an active element T6. In the embodiment, the active element T1 is electrically connected with the scan line SL1, the data line DL1 and the first electrode PE1, the active element T2 is electrically connected with the scan line SL1, the data line DL2 and the first electrode PE2, the active element T3 is electrically connected with the scan line SL1, the data line DL3 and the first electrode PE3, the active element T4 is electrically connected with the scan line SL2, the data line DL2 and the first electrode PE4, the active element T5 is electrically connected with the scan line SL2, the data line DL3 and the first electrode PE5, the active element T6 is electrically connected with the scan line SL2, the data line DL4 and the first electrode PE6. That is to say, in the embodiment, the first electrodes PE1, PE2, PE3, PE4, PE5 and PE6 respectively serve as the pixel electrode for the first sub-pixel P1, the pixel electrode for the second sub-pixel P2, the pixel electrode for the third sub-pixel P3, the pixel electrode for the fourth sub-pixel P4, the pixel electrode for the fifth sub-pixel P5 and the pixel electrode for the sixth sub-pixel P6.

The active elements T1, T2, T3, T4, T5 and T6 may be any active element known to persons of ordinary skill in the art. In the embodiment, the active elements T1, T2, T3, T4, T5 and T6 are a bottom gate thin film transistor, which includes a gate, a channel layer, a source and a drain, which should not be construed as a limitation to the invention. In other embodiment, the active elements T1, T2, T3, T4, T5 and T6 may be a top gate thin film transistor.

In addition, in the embodiment, the active elements T1, T2, T3, T4, T5 and T6 are further covered by the protecting layer BP to protect the active elements T1, T2, T3, T4, T5 and T6. The material of the protecting layer BP may be an inorganic material, an organic material or a combination thereof, wherein the inorganic material may be silicon oxide, silicon nitride, silicon oxynitride, or a stacked layer of at least two materials mentioned above; the organic material is polymer material such as a polyimide-based resin, an epoxy-based resin, or an acrylic-based resin.

In the embodiment, the common electrode layer CM may be a non-patterned electrode layer. A portion of the common electrode layer CM corresponding to the first electrode PE1 serves as a second electrode of the first sub-pixel P1. A portion of the common electrode layer CM corresponding to the first electrode PE2 serves as a second electrode of the second sub-pixel P2. A portion of the common electrode layer CM corresponding to the first electrode PE3 serves as a second electrode of the third sub-pixel P3. A portion of the common electrode layer CM corresponding to the first electrode PE4 serves as a second electrode of the fourth sub-pixel P4. A portion of the common electrode layer CM corresponding to the first electrode PE5 serves as a second electrode of the fifth sub-pixel P5. A portion of the common electrode layer CM corresponding to the first electrode PE6 serves as a second electrode of the sixth sub-pixel P6. In other words, in the embodiment, said second electrodes respectively serve as the common electrode for the first sub-pixel P1, the common electrode for the second sub-pixel P2, the common electrode for the third sub-pixel P3, the common electrode for the fourth sub-pixel P4, the common electrode for the fifth sub-pixel P5 and the common electrode for the sixth sub-pixel P6.

In the embodiment, the interlayered insulating layer IL is further disposed between the common electrode layer CM and the first electrodes PE1, PE2, PE3, PE4, PE5 and PE6 such that the common electrode layer CM is structurally separated from the first electrodes PE1, PE2, PE3, PE4, PE5 and PE6. Additionally, as shown in FIG. 2, the first electrode PE1 and the first electrode PE4 are disposed above the interlayered insulating layer IL, and the common electrode layer CM is disposed under the interlayered insulating layer IL. That is to say, in the embodiment, the common electrode layer CM is correspondingly disposed under the first electrodes PE1, PE2, PE3, PE4, PE5 and PE6.

The common electrode layer CM is, for example, a transparent conductive layer, and the material thereof includes metal oxide conductive material such as indium tin oxide, indium zinc oxide, aluminum tin oxide, aluminum zinc oxide, indium germanium zinc oxide, or other suitable oxide, or a stacked layer of at least two materials mentioned above. The material of the interlayered insulating layer IL may be an inorganic material, an organic material or a combination thereof, wherein the inorganic material is, for example, silicon oxide, silicon nitride, silicon oxynitride, or a stacked layer of at least two materials mentioned above; an organic material is polymer material such as a polyimide-based resin, an epoxy-based resin or an acrylic-based resin.

In the embodiment, the common electrode layer CM is electrically connected with a common voltage Vcom1. The negative voltage received by the data line is defined as a situation that the voltage received by the data line is smaller than the common voltage Vcom1. The positive voltage received by the data line is defined as a situation that the voltage received by the data line is larger than the common voltage Vcom1.

In the embodiment, when the liquid crystal display panel 10 is in the display mode, a fringe electric field is generated between the first electrodes PE1, PE2, PE3, PE4, PE5 and PE6 and the common electrode layer CM. That is to say, the liquid crystal display panel 10 is a fringe field switching (FFS) liquid crystal display panel. Moreover, as described above, when the liquid crystal display panel 10 is in the display mode, an included angle, which is larger than or equal to 45 degrees and smaller than 90 degrees, is formed substantially between the fringe electric field direction and the first direction D1. In the embodiment, the liquid crystal molecule (not shown) in the liquid crystal layer 120 is driven by the fringe electric field and deflects accordingly.

The first control electrode CE1 is disposed on the second substrate 110 and overlaps the first sub-pixel P1, the second sub-pixel P2, the third sub-pixel P3, and the second control electrode CE2 is disposed on the second substrate 110 and overlaps the fourth sub-pixel P4, the fifth sub-pixel P5, and the sixth sub-pixel P6. In other words, in the embodiment, the first control electrode CE1 and the second control electrode CE2 are arranged in sequence along the second direction D2.

Furthermore, the polarity of the first control electrode CE1 is different from the polarity of the second electrode CE2. For example, in an embodiment, the first control electrode CE1 is electrically connected with the positive voltage, and the second control electrode CE2 is electrically connected to the negative voltage. In the descriptions, the negative voltage received by the control electrode is defined as a situation that the voltage received by the control electrode is smaller than the common voltage Vcom1 of the common electrode layer CM. The positive voltage received by the control electrode is defined as a situation that the voltage received by the control electrode is larger than the common voltage Vcom1 of the common electrode layer CM.

In the embodiment, the first control electrode CE1 is electrically connected with a common voltage Vcom2, and the second control electrode CE2 is electrically connected with a common voltage Vcom3. In this manner, when the first control electrode CE1 is electrically connected with the positive voltage, and the second control electrode CE2 is electrically connected with the negative voltage, the common voltage Vcom2 is larger than the common voltage Vcom1, and the common voltage Vcom3 is smaller than the common voltage Vcom1.

Additionally, when the liquid crystal display panel 10 is in the display mode, the first control electrode CE1 is electrically connected with the common voltage Vcom2 so as to generate a vertical electric field between the first control electrode CE1 and at least one of the first electrodes PE1, PE2 and PE3. Meanwhile, the second control electrode CE2 is electrically connected with the common voltage Vcom3 so as to generate a vertical electric field between the second control electrode CE2 and at least one of the first electrodes PE4, PE5 and PE6.

It should be mentioned that, when the liquid crystal display panel 10 is in the display mode and the liquid crystal display panel 10 generates the vertical electric field, the longitudinal axis of the liquid crystal molecule (not shown) in the liquid crystal layer 120 that is driven by the vertical electric field is approximately perpendicular to the first substrate 100 and the second substrate 110, such that the display brightness presented at a partial side viewing angle is reduced significantly, thereby achieving the privacy protection effect. That is to say, in the condition that the first control electrode CE1 and the second control electrode CE2 are respectively electrically connected with the common voltage Vcom2 and the common voltage Vcom3, the liquid crystal display panel 10 may carry out a narrow viewing angle display mode that has privacy protection function. In the condition that the first control electrode CE1 and the second control electrode CE2 do not receive any common voltage, the liquid crystal display panel 10 may carry out a wide viewing angle display mode, namely, a normal display mode.

In the embodiment, the alignment film 130a and the alignment film 130b are configured to align the liquid crystal molecule (not shown) in the liquid crystal layer 120 along the first direction D1. That is to say, the alignment direction of the alignment film 130a and the alignment film 130b is the first direction D1. In the embodiment, when not being driven by the electric field, the liquid crystal molecule (not shown) in the liquid crystal layer 120 is maintained in a condition that the longitudinal axis is substantially parallel with the first direction D1. In the embodiment, the alignment film 130a is disposed on the first substrate 100 and located between the first substrate 100 and the liquid crystal layer 120. The alignment film 130b is disposed on the second substrate 110 and located between the second substrate 110 and the liquid crystal layer 120.

In the liquid crystal display panel 10, with the design that the polarity of first sub-pixel P1 is the same as the polarity of the third sub-pixel P3, the polarity of the second sub-pixel P2 is different from the polarity of the first sub-pixel P1 and the polarity of the third sub-pixel P3, the polarity of the fourth sub-pixel P4 is the same as the polarity of the sixth sub-pixel P6, the polarity of the fifth sub-pixel P5 is different from the polarity of the fourth sub-pixel P4 and the polarity of the sixth sub-pixel P6, the polarity of the fourth sub-pixel P4 is different from the polarity of the first sub-pixel P1, the polarity of the first control electrode CE1 is different from the polarity of the second control electrode CE2, and in the first direction D1, the extending directions of the slit patterns of any two adjacent ones of the first electrodes PE1, PE2, PE3, PE4, PE5 and PE6 are different, when the liquid crystal display panel 10 is in the narrow viewing angle display mode, the liquid crystal molecule that is driven by the vertical electric field deflects in the same deflection direction. In this manner, the display brightness presented at a viewing angle on the left side or right side of the normal viewing angle of the liquid crystal display panel 10 is reduced significantly, such that the effect of single-sided privacy protection effect can be achieved.

For example, when the liquid crystal display panel 10 is in the display mode, and the first sub-pixel P1 receives a positive voltage which is 9 V, the second sub-pixel P2 receives a negative voltage which is 1 V, the third sub-pixel P3 receives a positive voltage which is 9 V, the fourth sub-pixel P4 receives a negative voltage which is 1 V, the fifth sub-pixel P5 receives a positive voltage which is 9 V, the sixth sub-pixel P6 receives a negative voltage which is 1 V, the common electrode layer CM receives the common voltage Vcom1 which is 5 V, the first control electrode CE1 receives positive common voltage Vcom2 which is 8 V and the second control electrode CE2 receives a negative common voltage Vcom3 which is 3 V, a vertical electric field is generated between the first control electrode CE1 and the first electrode PE2 of the second sub-pixel P2, and a vertical electric field is generated between the second control electrode CE2 and the first electrode PE5 of the fifth sub-pixel P5. Specifically, since the first electrode PE2 and the first electrode PE5 have the same construction, and the included angle between the extending direction of each slit pattern St2 of the first electrode PE2 and the first direction D1 is a negative angle, the display brightness presented at the viewing angle on the right side of the normal viewing angle of the liquid crystal display panel 10 is reduced significantly. In other words, at this time, the user on the right side of the liquid crystal display panel 10 cannot see the display image clearly, and thus the single-sided privacy protection effect can be achieved.

Figure 4:
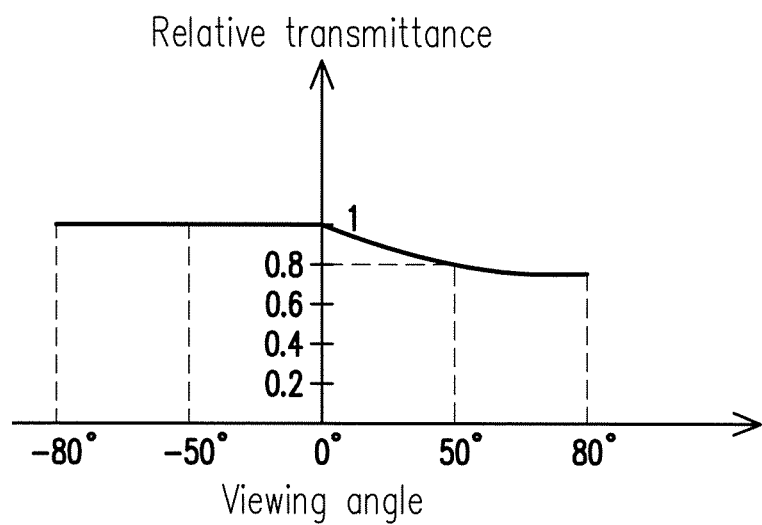
FIG. 4 is a diagram illustrating a relationship between a viewing angle of the liquid crystal display panel in the first embodiment at an azimuth angle of 0 degree and a relative transmittance.
Figure 5:
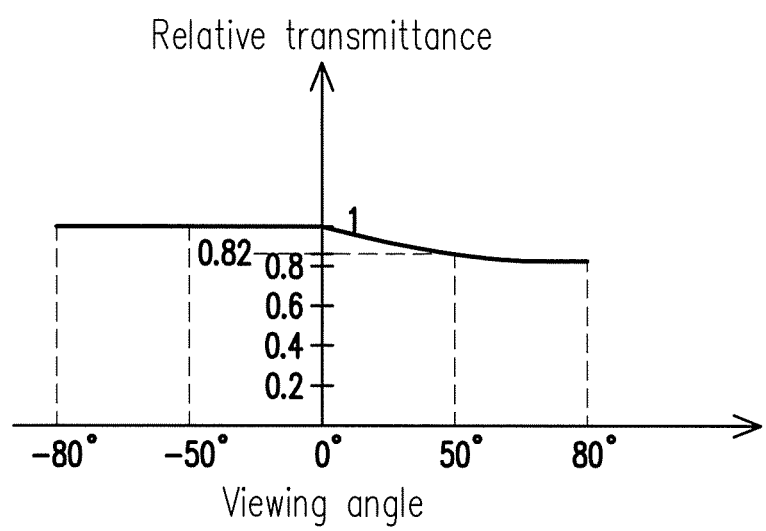
FIG. 5 is a diagram illustrating a relationship between a viewing angle of the liquid crystal display panel in the first embodiment at an azimuth angle of 45 degrees and a relative transmittance.

The situation that the liquid crystal display panel 10 performs display under the operation condition described above, and the liquid crystal display panel 10 is capable of achieving the single-sided privacy protection effect accordingly is described following with reference to FIG. 4 and FIG. 5. FIG. 4 is a diagram illustrating a relationship between a viewing angle of the liquid crystal display panel in the first embodiment at an azimuth angle of 0 degree and a relative transmittance. FIG. 5 is a diagram illustrating a relationship between a viewing angle of the liquid crystal display panel in the first embodiment at an azimuth angle of 45 degrees and a relative transmittance. The viewing angle of 0° in FIG. 4 and FIG. 5 indicates that the included angle between said viewing angle and the front view normal of the liquid crystal display panel 10 is 0°. The viewing angles of 50° and −50° in FIG. 4 and FIG. 5 indicate that the included angle between each said viewing angle and the front view normal of the liquid crystal display panel 10 is 50°. The terms positive and negative are merely used to describe directions, wherein deflection to the right side direction is positive, and deflection to the left side direction is negative. Moreover, the relative transmittance refers to a ratio obtained by dividing the side view viewing angle brightness by the maximum brightness of normal viewing angle.

FIG. 4 and FIG. 5 show that, at an azimuth angle of 0 degree, the brightness at the left side viewing angle 50° of the liquid crystal display panel 10 is about 20% higher than the brightness at the right side viewing angle 50° of the liquid crystal display panel 10. At an azimuth angle of 45 degrees, the brightness at the left side viewing angle 50° of the liquid crystal display panel 10 is about 18% higher than the brightness at the right side viewing angle 50° of the liquid crystal display panel 10. The result proves that the liquid crystal display panel 10 is capable of effectively achieving the privacy protection effect at a specific viewing angle.

In another example, when the liquid crystal display panel 10 is in the display mode, and the first sub-pixel P1 receives positive voltage which is 9 V, the second sub-pixel P2 receives negative voltage which is 1 V, the third sub-pixel P3 receives positive voltage which is 9 V, the fourth sub-pixel P4 receives negative voltage which is 1 V, the fifth sub-pixel P5 receives positive voltage which is 9 V, the sixth sub-pixel P6 receives negative voltage which is 1 V, the common electrode layer CM receives the common voltage Vcom1 which is 5 V, the first control electrode CE1 receives the negative common voltage Vcom2 which is 3 V and the second control electrode CE2 receives positive common voltage Vcom3 which is 8 V, a vertical electric field is generated between the first control electrode CE1 and the first electrode PE1 of the first sub-pixel P1, a vertical electric field is generated between the first control electrode CE1 and the first electrode PE3 of the third sub-pixel P3, a vertical electric field is generated between the second control electrode CE2 and the first electrode PE4 of the fourth sub-pixel P4, and a vertical electric field is generated between the second control electrode CE2 and the first electrode PE6 of the sixth sub-pixel P6. Specifically, since the first electrodes PE1, PE3, PE4 and PE6 have the same construction, and the included angle between the extending direction of each slit pattern SU of the first electrode PE1 and the first direction D1 is a positive angle, the display brightness presented at the viewing angle on the left side of the normal viewing angle of the liquid crystal display panel 10 is reduced significantly. That is to say, at this time, the user on the left side of the liquid crystal display panel 10 cannot see the display image clearly, and thus the effect of single-sided privacy protection can be achieved.

In addition, although FIG. 1 shows that all of the first electrodes PE1, PE2, PE3, PE4, PE5 and PE6 include eight branches (e.g., branches E1, E2), which should not be construed as a limitation to the invention. In other embodiment, depending on actual requirement, persons of ordinary skill in the art may adjust the number of branch, and the first electrodes PE1, PE2, PE3, PE4, PE5 and PE6 respectively fall within the scope of the invention as long as they have at least two branches. That is, the first electrodes PE1, PE2, PE3, PE4, PE5 and PE6 respectively fall within the scope of the invention as long as they have at least one slit pattern.

Moreover, in the first embodiment, the first electrode (e.g., first electrodes PE1, PE2, PE3, PE4, PE5 and PE6) having the slit pattern (e.g., slit patterns St1, St2) serves as the pixel electrode and is electrically connected with the active element (e.g., active elements T1, T2, T3, T4, T5, T6), which should not be construed as a limitation to the invention. In other embodiments, the first electrode having the slit pattern may serve as the common electrode, and the one that is electrically connected with the active element is the second electrode.

Based on the first embodiment, according to an embodiment of the invention, with the design that the liquid crystal display panel includes the first sub-pixel, the second sub-pixel and the third sub-pixel arranged in sequence along the first direction in the first sub-pixel row, the fourth sub-pixel, the fifth sub-pixel and the sixth sub-pixel arranged along the first direction in the second sub-pixel row, the first control electrode that overlaps the first sub-pixel, the second sub-pixel and the third sub-pixel, and the second control electrode that overlaps the fourth sub-pixel, the fifth sub-pixel and the sixth sub-pixel, wherein each of the first sub-pixel, the second sub-pixel, the third sub-pixel, the fourth sub-pixel, the fifth sub-pixel and the sixth sub-pixel includes the first electrode having at least one slit pattern, the fourth sub-pixel and the first sub-pixel are arranged in the second direction that intersects the first direction, the polarity of the first sub-pixel is the same as the polarity of the third sub-pixel, the polarity of the second sub-pixel is different from the polarity of the first sub-pixel and the polarity of the third sub-pixel, the polarity of the fourth sub-pixel is the same as the polarity of the sixth sub-pixel, the polarity of the fifth sub-pixel is different from the polarity of the fourth sub-pixel and the polarity of the sixth sub-pixel, the polarity of the fourth sub-pixel is different from the polarity of the first sub-pixel, the polarity of the first control electrode is different from the polarity of the second control electrode, and in the first direction, the extending directions of at least one slit pattern of any two adjacent ones of the first sub-pixel, the second sub-pixel, the third sub-pixel, the fourth sub-pixel, the fifth sub-pixel and the sixth sub-pixel are different, the liquid crystal display panel is capable of achieving the privacy protection effect at a specific viewing angle.

Figure 6:
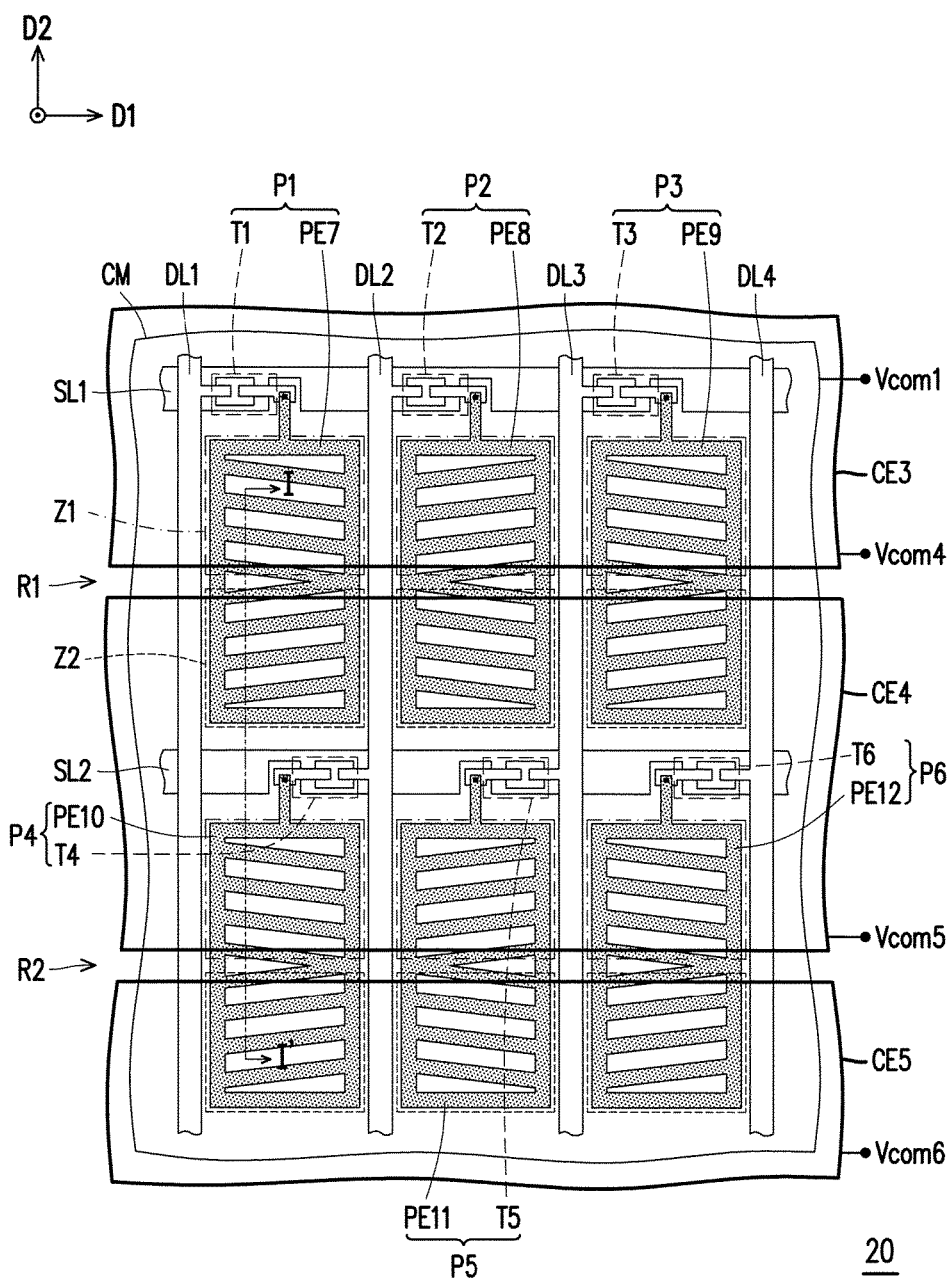
FIG. 6 is a top view illustrating a liquid crystal display panel according to a second embodiment of the invention.
Figure 7:
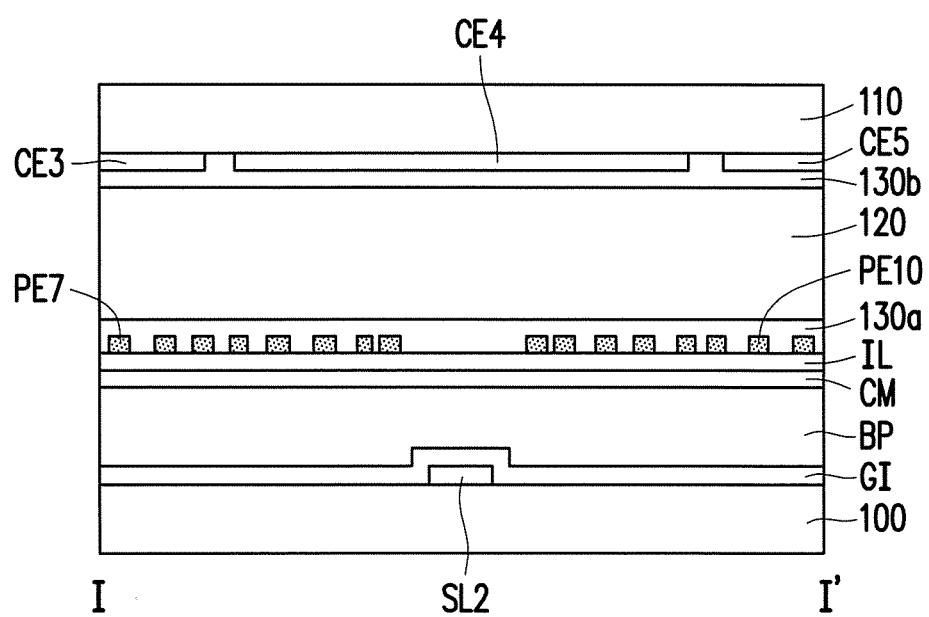
FIG. 7 is a cross-sectional view taken along line I-I' in FIG. 6.
Figure 8:
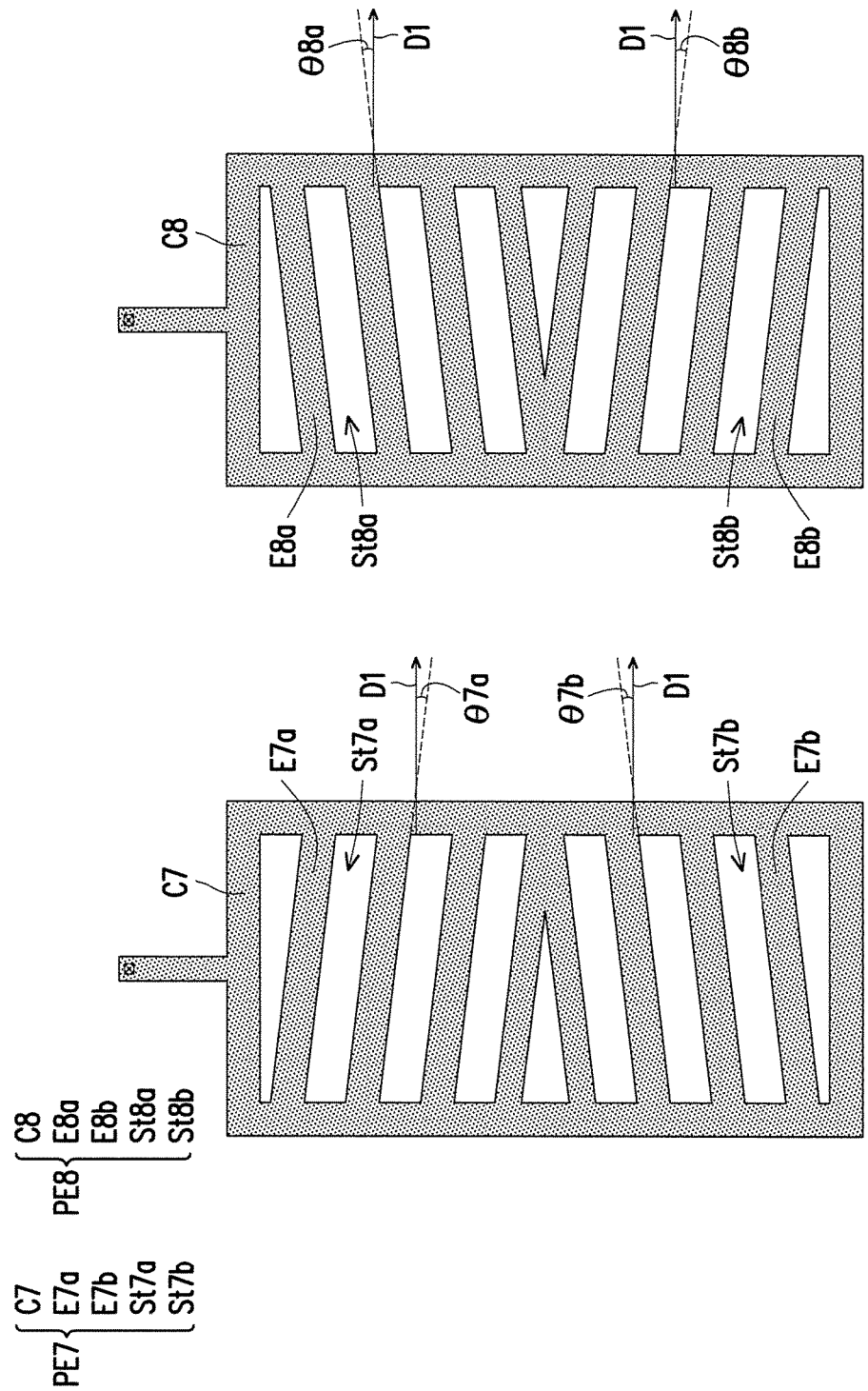
FIG. 8 is an enlarged top view illustrating a first electrode PE7 and a first electrode PE8 in FIG. 6.

FIG. 6 is a top view illustrating a liquid crystal display panel according to a second embodiment of the invention. FIG. 7 is a cross-sectional view taken along line I-I' in FIG. 6. FIG. 8 is an enlarged top view illustrating a first electrode PE7 and a first electrode PE8 in FIG. 6. Referring to FIG. 6 and FIG. 1, a liquid crystal display panel 20 in FIG. 6 is similar to the liquid crystal display panel 10 in FIG. 1. Therefore, identical or similar elements are denoted by identical or similar symbols, and identical technical content is omitted. The previous embodiments may serve as reference for the omitted descriptions. The differences between the two are described below.

Referring to FIG. 6 to FIG. 8, in the embodiment, each of the first sub-pixel P1, the second sub-pixel P2, the third sub-pixel P3, the fourth sub-pixel P4, the fifth sub-pixel P5 and the sixth sub-pixel P6 includes a first zone Z1 and a second zone Z2, wherein the first zone Z1 and the second zone Z2 are arranged in sequence along the second direction D2.

In the embodiment, the first sub-pixel P1 includes a first electrode PE7, the second sub-pixel P2 includes a first electrode PE8, the third sub-pixel P3 includes a first electrode PE9, the fourth sub-pixel P4 includes a first electrode PE10, the fifth sub-pixel P5 includes a first electrode PE11, and the sixth sub-pixel P6 includes a first electrode PE12. Each of the first electrodes PE7, PE8, PE9, PE10, PE11, PE12 is, for example, a transparent conductive layer, and the material thereof includes a metal oxide conductive material such as indium tin oxide, indium zinc oxide, aluminum tin oxide, aluminum zinc oxide, indium germanium zinc oxide, or other suitable oxide, or a stacked layer of at least two materials mentioned above.

Referring to FIG. 6 and FIG. 8, in the embodiment, the first electrode PE7 includes a frame C7, and first branches E7a and second branches E7b connected with the frame C7, wherein a first slit pattern St7a is formed between two adjacent first branches E7a, and a second slit pattern St7b is formed between two adjacent second branches E7b; and the first electrode PE8 includes a frame C8 and first branches E8a and second branches E8b connected with the frame C8, wherein a first slit pattern St8a is located between two adjacent first branches E8a, and a second slit pattern St8b is disposed between two adjacent second branches E8b. In other words, in the embodiment, the first electrode PE7 and the first electrode PE8 are patterned electrodes.

In the embodiment, each first slit pattern St7a of the first electrode PE7 is in the first zone Z1 but not in the second zone Z2, each first slit pattern St8a of the first electrode PE8 is in the first zone Z1 but not in the second zone Z2, each second slit pattern St7b of the first electrode PE7 is in the second zone Z2 but not in the first zone Z1, and each second slit pattern St8b of the first electrode PE8 is in the second zone Z2 but not in the first zone Z1.

In the embodiment, an included angle θ7a between an extending direction of each first slit pattern St7a of the first electrode PE7 and the first direction D1 is larger than 0 degree and smaller than or equal to 45 degrees, an included angle θ7b between an extending direction of each second slit pattern St7b of the first electrode PE7 and the first direction D1 is larger than 0 degree and smaller than or equal to 45 degrees, an included angle θ8a between an extending direction of each first slit pattern St8a of the first electrode PE8 and the first direction D1 is larger than 0 degree and smaller than or equal to 45 degrees, an included angle θ8b between an extending direction of each second slit pattern St8b of the first electrode PE8 and the first direction D1 is larger than 0 degree and smaller than or equal to 45 degrees.

In addition, in the descriptions, the first direction D1 serves as a basis, the included angle θ7b between the extending direction of each second slit pattern St7b of the first electrode PE7 and the first direction D1 as well as the included angle θ8a between the extending direction of each first slit pattern St8a of the first electrode PE8 and the first direction D1 are defined as a positive angle. Meanwhile, the included angle θ7a between the extending direction of each first slit pattern St7a of the first electrode PE7 and the first direction D1 as well as the included angle θ8b between the extending direction of each second slit pattern St8b of the first electrode PE8 and the first direction D1 are defined as a negative angle. That is to say, in the embodiment, the extending direction of each first slit pattern St7a of the first electrode PE7 is different from the extending direction of each second slit pattern St7b, the extending direction of each first slit pattern St8a of the first electrode PE8 is different from the extending direction of each second slit pattern St8b, the extending direction of each first slit pattern St7a of the first electrode PE7 is different from the extending direction of each first slit pattern St8a of the first electrode PE8, and the extending direction of each second slit pattern St7b of the first electrode PE7 is different from the extending direction of each second slit pattern St8b of the first electrode PE8. In this manner, when being driven by the electric field, the deflection direction of the liquid crystal molecule in the liquid crystal layer 120 corresponding to each first slit pattern St7a of the first electrode PE7 is opposite to the deflection direction of the liquid crystal molecule in the liquid crystal layer 120 corresponding to each second slit pattern St7b of the first electrode PE7, and the deflection direction of the liquid crystal molecule in the liquid crystal layer 120 corresponding to each first slit pattern St8a of the first electrode PE8 is opposite to the deflection direction of the liquid crystal molecule in the liquid crystal layer 120 corresponding to each second slit pattern St8b of the first electrode PE8.

Moreover, as shown in FIG. 6, in the embodiment, the first electrodes PE9, PE10, PE12 have the same construction as the first electrode PE7, and the first electrode PE11 has the same construction as the first electrode PE8. Based on the above, according to the descriptions regarding the first electrode PE7 and the first electrode PE8, persons of ordinary skill in the art should be able to understand the detailed structure of the first electrodes PE9, PE10, PE11 and PE12; therefore, no further descriptions are incorporated herein. Furthermore, according to the descriptions regarding the first electrode PE7 and the first electrode PE8, persons of ordinary skill in the art should be able to understand that the extending direction of each first slit pattern of the first electrode PE9 is different from the extending direction of each first slit pattern St8a of the first electrode PE8, the extending direction of each first slit pattern of the first electrode PE10 is different from the extending direction of each first slit pattern of the first electrode PE11, and the extending direction of each first slit pattern of the first electrode PE12 is different from the extending direction of each first slit pattern of the first electrode PE11. In other words, in the embodiment, in the first direction D1, the extending directions of the first slit patterns of any two adjacent first electrodes are different.

In the embodiment, the liquid crystal display panel 20 includes a first control electrode CE3, a second control electrode CE4 and a third control electrode CE5 disposed on the second substrate 110. In the embodiment, the first control electrode CE3 overlaps the first zone Z1 of the first sub-pixel P1, the first zone Z1 of the second sub-pixel P2 and the first zone Z1 of the third sub-pixel P3, the second control electrode CE4 overlaps the second zone Z2 of the first sub-pixel P1, the second zone Z2 of the second sub-pixel P2 and the second zone Z2 of the third sub-pixel P3, the first zone Z1 of the fourth sub-pixel P4, the first zone Z1 of the fifth sub-pixel P5 and the first zone Z1 of the sixth sub-pixel P6, and the third control electrode CE5 overlaps the second zone Z2 of the fourth sub-pixel P4, the second zone Z2 of the fifth sub-pixel P5 and the second zone Z2 of the sixth sub-pixel P6. That is to say, in the embodiment, the first control electrode CE3, the second control electrode CE4 and the third control electrode CE5 are arranged in sequence along the second direction D2.

Moreover, in the embodiment, each of the first control electrode CE3, the second control electrode CE4 and the third control electrode CE5 overlaps two adjacent sub-pixel rows. As shown in FIG. 6, the second control electrode CE4 overlaps the first sub-pixel row R1 and the second sub-pixel row R2. Although it is not illustrated in FIG. 6, persons of ordinary skill in the art should be able to understand that first control electrode CE3 overlaps the first sub-pixel row R1 and the sub-pixel row above the first sub-pixel row R1 in the second direction D2, and the third control electrode CE5 overlaps the second sub-pixel row R2 and the sub-pixel row under the second sub-pixel row R2 in the second direction D2.

Furthermore, in the embodiment, the polarity of the first control electrode CE3 is different from the polarity of the second control electrode CE4, and the polarity of the third control electrode CE5 is different from the polarity of the second control electrode CE4. For example, in an embodiment, the first control electrode CE3 is electrically connected with the positive voltage, the second control electrode CE4 is electrically connected with the negative voltage, and the third control electrode CE5 is electrically connected with the positive voltage.

In the embodiment, the first control electrode CE3 is electrically connected with a common voltage Vcom4, the second control electrode CE4 is electrically connected with a common voltage Vcom5, the third control electrode CE5 is electrically connected with a common voltage Vcom6. Based on the above, according to the definition provided in the previous descriptions, when the first control electrode CE3 is electrically connected with the positive voltage, the second control electrode CE4 is electrically connected with the negative voltage, and the third control electrode CE5 is electrically connected with the positive voltage, the common voltage Vcom4 is substantially larger than the common voltage Vcom1, the common voltage Vcom5 is substantially smaller than the common voltage Vcom1, and the common voltage Vcom6 is substantially larger than the common voltage Vcom1.

Moreover, when the liquid crystal display panel 20 is in the display mode, the first control electrode CE3 is electrically connected with the common voltage Vcom4 so as to generate a vertical electric field between the first control electrode CE3 and at least one of the first electrodes PE7, PE8 and PE9 in the first zone Z1; the second control electrode CE4 is electrically connected with the common voltage Vcom5 so as to generate a vertical electric field between the second control electrode CE4 and at least one of the first electrodes PE7, PE8, PE9 in the second zone Z2 along with at least one of the first electrodes PE10, PE11, PE12 in the first zone Z1; and the third control electrode CE5 is electrically connected with the common voltage Vcom6 so as to generate a vertical electric field between the third control electrode CE5 and at least one of the first electrodes PE10, PE11, PE12 in the second zone Z2.

When the liquid crystal display panel 20 is in the display mode and the vertical electric field is generated in the liquid crystal display panel 20, the longitudinal axis of the liquid crystal molecule (not shown) in the liquid crystal layer 120 driven by the vertical electric field is approximately perpendicular to the first substrate 100 and the second substrate 110, such that the display brightness presented at the partial side viewing angle is reduced significantly so as to achieve the privacy protection effect. In other words, under the condition that the first control electrode CE3, the second control electrode CE4, and the third control electrode CE5 are respectively electrically connected with the common voltage Vcom4, the common voltage Vcom5, and the common voltage Vcom6, the liquid crystal display panel 20 may carry out the narrow viewing angle display mode having a privacy protection function; and under the condition that the first control electrode CE3, the second control electrode CE4 and the third control electrode CE5 do not receive any common voltage, the liquid crystal display panel 20 may carry out the wide viewing angle display mode, namely, a normal display mode.

Based on the first embodiment, it is shown that, in the liquid crystal display panel 20, with the design that the polarity of the first sub-pixel P1 is the same as the polarity of the third sub-pixel P3, the polarity of the second sub-pixel P2 is different from the polarity of the first sub-pixel P1 and the polarity of the third sub-pixel P3, the polarity of the fourth sub-pixel P4 is the same as the polarity of the sixth sub-pixel P6, the polarity of the fifth sub-pixel P5 is different from the polarity of the fourth sub-pixel P4 and the polarity of the sixth sub-pixel P6, the polarity of the fourth sub-pixel P4 is different from the polarity of the first sub-pixel P1, the polarity of the first control electrode CE3 is different from the polarity of the second control electrode CE4, the polarity of the third control electrode CE5 is different from the polarity of the second control electrode CE4, the extending direction of each first slit pattern of each of the first electrodes PE7, PE8, PE9, PE10, PE11, PE12 is different from the extending direction of each second slit pattern of each of the first electrodes PE7, PE8, PE9, PE10, PE11, PE12, and in the first direction D1, the extending directions of the first slit patterns of any two adjacent ones of the first electrodes PE7, PE8, PE9, PE10, PE11, PE12 are different, when the liquid crystal display panel 20 is in the narrow viewing angle display mode, the liquid crystal molecule driven by the vertical electric field deflects in the same deflection direction. Accordingly, the display brightness presented at the viewing angle on the left side or right side of the normal viewing angle of the liquid crystal display panel 20 is reduced significantly, such that the single-sided privacy protection effect can be attained.

For example, when the liquid crystal display panel 20 is in the display mode, and in the condition that the first sub-pixel P1 receives negative voltage which is 1 V, the second sub-pixel P2 receives positive voltage which is 9 V, the third sub-pixel P3 receives the negative voltage which is 1 V, the fourth sub-pixel P4 receives positive voltage which is 9 V, the fifth sub-pixel P5 receives negative voltage which is 1V, the sixth sub-pixel P6 receives positive voltage which is 9 V, the common electrode layer CM receives the common voltage Vcom1 which is 5 V, the first control electrode CE3 receives positive common voltage Vcom4 which is 8 V, the second control electrode CE4 receives negative common voltage Vcom5 which is 3 V and the third control electrode CE5 receives the positive common voltage Vcom6 which is 8 V, a vertical electric field is generated between the first control electrode CE3 and the first electrode PE7 of the first sub-pixel P1 in the first zone Z1, a vertical electric field is generated between the first control electrode CE3 and the first electrode PE9 of the third sub-pixel P3 in the first zone Z1, a vertical electric field is generated between the second control electrode CE4 and the first electrode PE8 of the second sub-pixel P2 in the second zone Z2, a vertical electrical field is generated between the second control electrode CE4 and the first electrode PE10 of the fourth sub-pixel P4 in the first zone Z1, a vertical electrical field is generated between the second control electrode CE4 and the first electrode PE12 of the sixth sub-pixel P6 in the first zone Z1, and a vertical electric field is generated between the third control electrode CE5 and the first electrode PE11 of the fifth sub-pixel P5 in the second zone Z2. Furthermore, since the first electrodes PE9, PE10, PE12 have the same construction as the first electrode PE7, the first electrode PE11 has the same construction as the first electrode PE8, and the included angle between the extending direction of each first slit pattern St7a of the first electrode PE7 in the first zone Z1 and the first direction D1 as well as the included angle between the extending direction of each second slit pattern St8b of the first electrode PE8 in the second zone Z2 and the first direction D1 are negative angles, the display brightness presented at the viewing angle on the right side of the normal viewing angle of the liquid crystal display panel 20 is reduced significantly. In other words, at this time, the user on the right side of the liquid crystal display panel 20 cannot see the display image clearly, such that the single-sided privacy protection effect can be attained.

In still another example, when the liquid crystal display panel 20 is in the display mode, and in the condition that the first sub-pixel P1 receives the negative voltage which is 1 V, the second sub-pixel P2 receives positive voltage which is 9 V, the third sub-pixel P3 receives negative voltage which is 1 V, the fourth sub-pixel P4 receives positive voltage which is 9 V, the fifth sub-pixel P5 receives negative voltage which is 1 V, the sixth sub-pixel P6 receives positive voltage which is 9 V, the common electrode layer CM receives common voltage Vcom1 which is 5 V, the first control electrode CE3 receives negative common voltage Vcom4 which is 3 V, the second control electrode CE4 receives the positive common voltage Vcom5 which is 8 V and the third control electrode CE5 receives negative common voltage Vcom6 which is 3 V, a vertical electric field is generated between the first control electrode CE3 and the first electrode PE8 of the second sub-pixel P2 in the first zone Z1, a vertical electric field is generated between the second control electrode CE4 and the first electrode PE7 of the first sub-pixel P1 in the second zone Z2, a vertical electric field is generated between the second control electrode CE4 and the first electrode PE9 of the third sub-pixel P3 in the second zone Z2, a vertical electric field is generated between the second control electrode CE4 and the first electrode PE11 of the fifth sub-pixel P5 in the first zone Z1, a vertical electric field is generated between the third control electrode CE5 and the first electrode PE10 of the fourth sub-pixel P4 in the second zone Z2, and a vertical electric field is generated between the third control electrode CE5 and the first electrode PE12 of the sixth sub-pixel P6 in the first zone Z2. Specifically, since the first electrodes PE9, PE10, PE12 have the same construction as the first electrode PE7, the first electrode PE11 has the same construction as the first electrode PE8, and the included angle between the extending direction of each second slit pattern St7b of the first electrode PE7 in the second zone Z2 and the first direction D1 as well as the included angle between the extending direction of each first slit pattern St8a of the first electrode PE8 in the first zone Z1 and the first direction D1 are positive angle, the display brightness presented at the viewing angle on the left side of the normal viewing angle of the liquid crystal display panel 20 is reduced significantly. That is to say, at this time, the user on the left side of the liquid crystal display panel 20 cannot see the display image clearly, such that the single-sided privacy protection effect can be attained.

Also, in the second embodiment, each of the first control electrode CE3, the second control electrode CE4 and the third control electrode CE5 overlaps two adjacent sub-pixel rows, which should not be construed as a limitation to the invention. In other embodiment, the first control electrode, the second control electrode and the third control electrode may only overlap one sub-pixel row. The detailed embodiment is described below with reference to FIG. 9.

Figure 9:
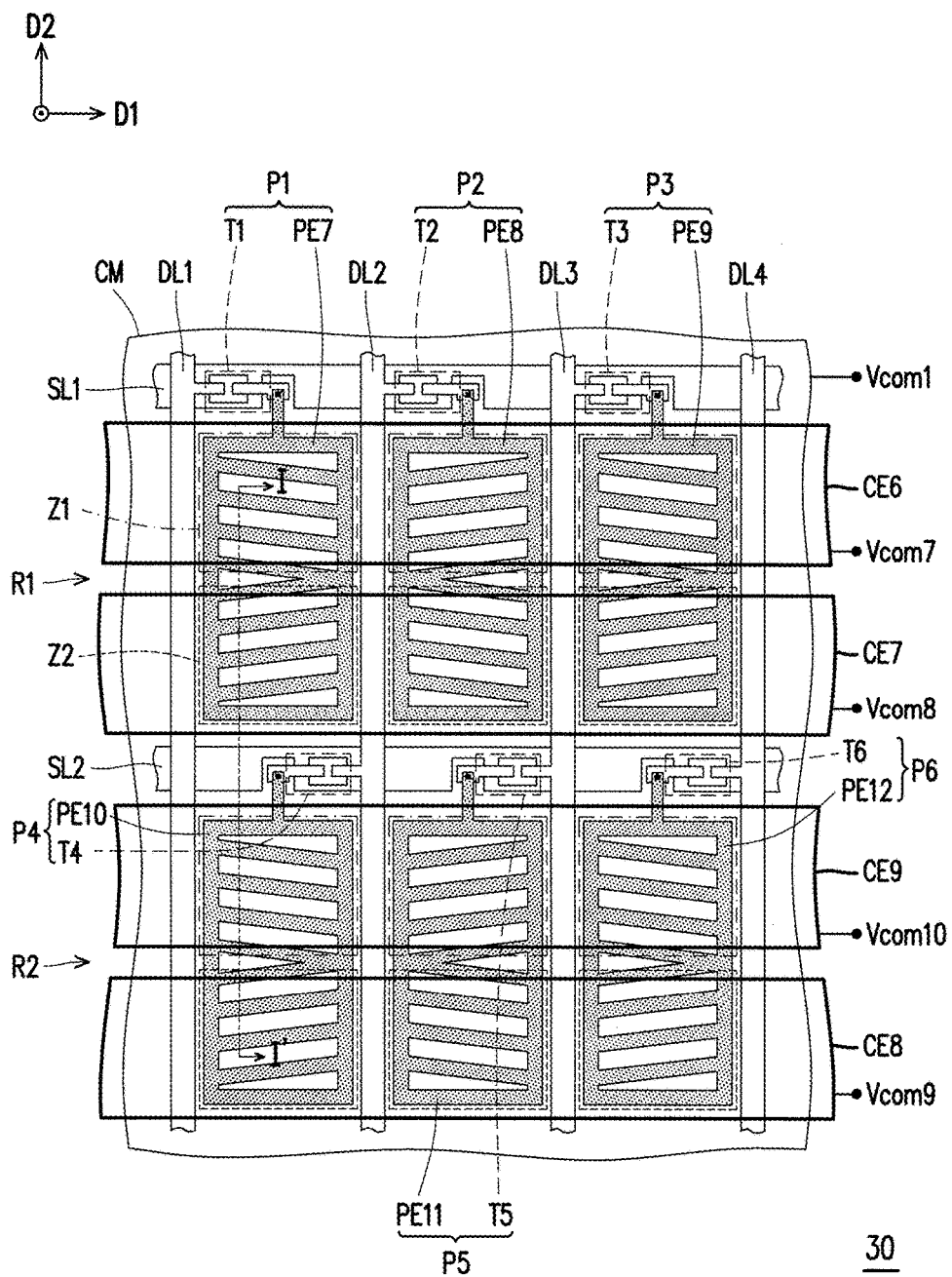
FIG. 9 is a top view illustrating a liquid crystal display panel according to a third embodiment of the invention.
Figure 10:
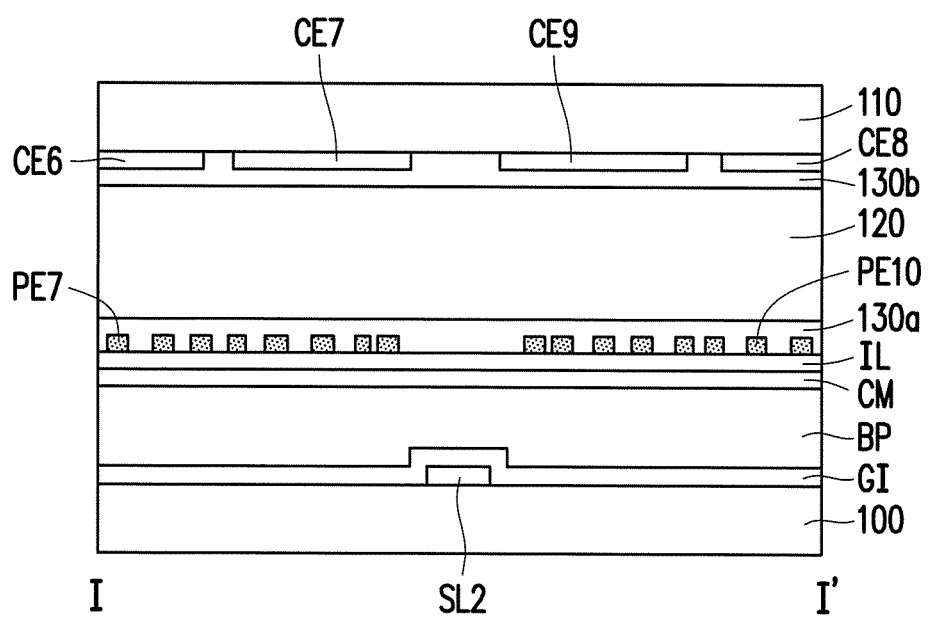
FIG. 10 is a cross-sectional view taken along line I-I' in FIG. 9.

FIG. 9 is a top view illustrating a liquid crystal display panel according to a third embodiment of the invention. FIG. 10 is a cross-sectional view taken along line I-I' in FIG. 9. Referring to FIG. 9 and FIG. 6, a liquid crystal display panel 30 in FIG. 9 is similar to the liquid crystal display panel 20 in FIG. 6; therefore, identical or similar elements are denoted by identical or similar symbols. Meanwhile, identical technical content is omitted. The previous embodiments may serve as reference for the omitted descriptions. The differences between the two are described below.

Referring to FIG. 9 and FIG. 10, in the embodiment, the liquid crystal display panel 30 includes a first control electrode CE6, a second control electrode CE7, a third control electrode CE8 and a fourth control electrode CE9 are disposed on the second substrate 110. In the embodiment, the first control electrode CE6 overlaps the first zone Z1 of the first sub-pixel P1, the first zone Z1 of the second sub-pixel P2 and the first zone Z1 of the third sub-pixel P3, the second control electrode CE7 overlaps the second zone Z2 of the first sub-pixel P1, the second zone Z2 of the second sub-pixel P2 and the second zone Z2 of the third sub-pixel P3, the third control electrode CE8 overlaps the second zone Z2 of the fourth sub-pixel P4, the second zone Z2 of the fifth sub-pixel P5 and the second zone Z2 of the sixth sub-pixel P6, and the fourth control electrode CE9 overlaps the first zone Z1 of the fourth sub-pixel P4, the first zone Z1 of the fifth sub-pixel P5 and the first zone Z1 of the sixth sub-pixel P6. In other words, in the embodiment, the first control electrode CE6, the second control electrode CE7, the fourth control electrode CE9 and the third control electrode CE8 are arranged in sequence in the second direction D2, and each of the first control electrode CE6, the second control electrode CE7, the fourth control electrode CE9 and the third control electrode CE8 only overlaps one sub-pixel row. The first control electrode CE6 and the second control electrode CE7 respectively only overlap the first sub-pixel row R1, and the fourth control electrode CE9 and the third control electrode CE8 respectively only overlap the second sub-pixel row R2.

In the embodiment, the polarity of the first control electrode CE6 is different from the polarity of the second control electrode CE7, the polarity of the third control electrode CE8 is different from the polarity of the fourth control electrode CE9, and the polarity of the third control electrode CE8 may be the same as or different from the polarity of the second control electrode CE7. For example, in an embodiment, the first control electrode CE6 is electrically connected with the positive voltage, the second control electrode CE7 is electrically connected with the negative voltage, the third control electrode CE8 is electrically connected with the positive voltage, and the fourth control electrode CE9 is electrically connected with the negative voltage; in another embodiment, the first control electrode CE6 is electrically connected with the positive voltage, the second control electrode CE7 is electrically connected with the negative voltage, the third control electrode CE8 is electrically connected with the negative voltage, and the fourth control electrode CE9 is electrically connected with the positive voltage.

In the embodiment, the first control electrode CE6 is electrically connected with a common voltage Vcom7, the second control electrode CE7 is electrically connected with a common voltage Vcom8, the third control electrode CE8 is electrically connected with a common voltage Vcom9, the fourth control electrode CE9 is electrically connected with a common voltage Vcom10. Based on the above, according to the definition provided in the previous descriptions, when the first control electrode CE6 is electrically connected with the positive voltage, the second control electrode CE7 is electrically connected with the negative voltage, the third control electrode CE8 is electrically connected with the positive voltage, and the fourth control electrode CE9 is electrically connected with the negative voltage, the common voltage Vcom7 is substantially larger than the common voltage Vcom1, the common voltage Vcom8 is substantially smaller than the common voltage Vcom1, the common voltage Vcom9 is substantially larger than the common voltage Vcom1, and the common voltage Vcom10 is substantially smaller than the common voltage Vcom1.

In addition, when the liquid crystal display panel 30 is in the display mode, the first control electrode CE6 is electrically connected with the common voltage Vcom7 so as to generate a vertical electric field between the first control electrode CE6 and at least one of the first electrodes PE7, PE8, PE9 in the first zone Z1; the second control electrode CE7 is electrically connected with the common voltage Vcom8 so as to generate a vertical electrical field between the second control electrode CE7 and at least one of the first electrodes PE7, PE8, PE9 in the second zone Z2; the third control electrode CE8 is electrically connected with the common voltage Vcom9 so as to generate a vertical electric field between the third control electrode CE8 and at least one of the first electrodes PE10, PE11, PE12 in the second zone Z2; and the fourth control electrode CE9 is electrically connected with the common voltage Vcom10 so as to generate a vertical electric field between the fourth control electrode CE9 and at least one of the first electrodes PE10, PE11, PE12 in the first zone Z1.

When the liquid crystal display panel 30 is in the display mode and the vertical electric field is generated in the liquid crystal display panel 30, the longitudinal axis of the liquid crystal molecule (not shown) in the liquid crystal layer 120 driven by the vertical electric field is approximately perpendicular to the first substrate 100 and the second substrate 110, such that the display brightness presented at partial or all side viewing angles is reduced significantly, thereby achieving the privacy protection effect. In other words, under the condition that the first control electrode CE6, the second control electrode CE7, the third control electrode CE8 and the fourth control electrode CE9 are respectively electrically connected with the common voltage Vcom7, the common voltage Vcom8, the common voltage Vcom9 and the common voltage Vcom10, the liquid crystal display panel 30 may carry out the narrow viewing angle display mode having the privacy protection function; and under the condition that the first control electrode CE6, the second control electrode CE7, the third control electrode CE8 and the fourth control electrode CE9 do not receive any common voltage, the liquid crystal display panel 30 may carry out the wide viewing angle display mode, namely, a normal display mode.

Based on the descriptions in the first and the second embodiments, it can be known that in the liquid crystal display panel 30, with the design that the polarity of the first sub-pixel P1 is the same as the polarity of the third sub-pixel P3, the polarity of the second sub-pixel P2 is different from the polarity of the first sub-pixel P1 and the polarity of the third sub-pixel P3, the polarity of the fourth sub-pixel P4 is the same as the polarity of the sixth sub-pixel P6, the polarity of the fifth sub-pixel P5 is different from the polarity of the third sub-pixel P3 and the polarity of the sixth sub-pixel P6, the polarity of the fourth sub-pixel P4 is different from the polarity of the first sub-pixel P1, the polarity of the first control electrode CE6 is different from the polarity of the second control electrode CE7, the polarity of the third control electrode CE8 is different from the polarity of the second control electrode CE7, the polarity of the third control electrode CE8 is different from the polarity of the fourth control electrode CE9, the extending direction of each first slit pattern in each of the first electrodes PE7, PE8, PE9, PE10, PE11, PE12 is different from the extending direction of each second slit pattern in each of the first electrodes PE7, PE8, PE9, PE10, PE11, PE12, and in the first direction D1, the extending directions of the first slit patterns of any two adjacent ones of the first electrodes PE7, PE8, PE9, PE10, PE11, PE12 are different, when the liquid crystal display panel 30 is in the narrow viewing angle display mode, the liquid crystal molecule driven by the vertical electric field deflects in the same deflection direction. In this manner, the display brightness presented at the viewing angle on the left side or right side of the normal viewing angle of the liquid crystal display panel 30 is reduced significantly, thereby achieving the single-sided privacy protection effect.

For example, when the liquid crystal display panel 30 is in the display mode, and in the condition that the first sub-pixel P1 receives the negative voltage which is 1 V, the second sub-pixel P2 receives the positive voltage which is 9 V, the third sub-pixel P3 receives the negative voltage which is 1 V, the fourth sub-pixel P4 receives the positive voltage which is 9 V, the fifth sub-pixel P5 receives the negative voltage which is 1 V, the sixth sub-pixel P6 receives the positive voltage which is 9 V, the common electrode layer CM receives the common voltage Vcom1 which is 5 V, the first control electrode CE6 receives the positive common voltage Vcom7 which is 8 V, the second control electrode CE7 receives the negative common voltage Vcom8 which is 3 V, the third control electrode CE8 receives the positive common voltage Vcom9 which is 8 V and the fourth control electrode CE9 receives the negative common voltage Vcom10 which is 3 V, a vertical electric field is generated between the first control electrode CE6 and first electrode PE7 of the first sub-pixel P1 in the first zone Z1, a vertical electric field is generated between the first control electrode CE6 and the first electrode PE9 of the third sub-pixel P3 in the first zone Z1, a vertical electric field is generated between the second control electrode CE7 and the first electrode PE8 of the second sub-pixel P2 in the second zone Z2, a vertical electric field is generated between the fourth control electrode CE9 and the first electrode PE10 of the fourth sub-pixel P4 in the first zone Z1, a vertical electric field is generated between the fourth control electrode CE9 and the first electrode PE12 of the sixth sub-pixel P6 in the first zone Z1, and a vertical electric field is generated between the third control electrode CE8 and the first electrode PE11 of the fifth sub-pixel P5 in the second zone Z2. Specifically, since the first electrodes PE9, PE10, PE12 have the same construction as the first electrode PE7, the first electrode PE11 has the same construction as the first electrode PE8, and the included angle between the extending direction of each first slit pattern St7a of the first electrode PE7 in the first zone Z1 and the first direction D1 as well as the included angle between the extending direction of each second slit pattern St8b of the first electrode PE8 in the second zone Z2 and the first direction D1 are negative angles, the display brightness presented at the viewing angle on the right side of the normal viewing angle of the liquid crystal display panel 30 is reduced significantly. That is to say, at this time, the user on the right side of the liquid crystal display panel 30 cannot see the display image clearly, and thus the single-sided privacy protection effect can be achieved.

In another example, when the liquid crystal display panel 30 is in the display mode, and in the condition that the first sub-pixel P1 receives the negative voltage which is 1 V, the second sub-pixel P2 receives positive voltage which is 9 V, the third sub-pixel P3 receives the negative voltage which is 1 V, the fourth sub-pixel P4 receives the positive voltage which is 9 V, the fifth sub-pixel P5 receives the negative voltage which is 1 V, the sixth sub-pixel P6 receives the positive voltage which is 9 V, the common electrode layer CM receives the common voltage Vcom1 which is 5 V, the first control electrode CE6 receives the negative common voltage Vcom7 which is 3 V, the second control electrode CE7 receives the positive common voltage Vcom8 which is 8 V, the third control electrode CE8 receives the negative common voltage Vcom9 which is 3 V and the fourth control electrode CE9 receives the positive common voltage Vcom10 which is 8 V, a vertical electric field is generated between the first control electrode CE6 and the first electrode PE8 of the second sub-pixel P2 in the first zone Z1, a vertical electric field is generated between the second control electrode CE7 and the first electrode PE7 of the first sub-pixel P1 in the second zone Z2, a vertical electric field is generated between the second control electrode CE7 and the first electrode PE9 of the third sub-pixel P3 in the second zone Z2, a vertical electric field is generated between the fourth control electrode CE9 and the first electrode PE11 of the fifth sub-pixel P5 in the first zone Z1, a vertical electric field is generated between the third control electrode CE8 and the first electrode PE10 of the fourth sub-pixel P4 in the second zone Z2, and a vertical electric field is generated between the third control electrode CE8 and the first electrode PE12 of the sixth sub-pixel P6 in the second zone Z2. Furthermore, since the first electrodes PE9, PE10, PE12 have the same construction as the first electrode PE7, the first electrode PE11 has the same construction as the first electrode PE8, and the included angle between the extending direction of each second slit pattern St7b of the first electrode PE7 in the second zone Z2 as well as the extending direction of each first slit pattern St8a of the first electrode PE8 in the first zone Z1 and the first direction D1 is a positive angle, the display brightness presented at the viewing angle on the left side of the normal viewing angle of the liquid crystal display panel 30 is reduced significantly. That is to say, at this time, the user on the left side of the liquid crystal display panel 30 cannot see the display image clearly, and thus the single-sided privacy protection effect can be attained.

Furthermore, based on the descriptions in the first and the second embodiments, it can be known that in the liquid crystal display panel 30, with the design that the polarity of first sub-pixel P1 is the same as the polarity of the third sub-pixel P3, the polarity of the second sub-pixel P2 is different from the polarity of the first sub-pixel P1 and the polarity of the third sub-pixel P3, the polarity of the fourth sub-pixel P4 is the same as the polarity of the sixth sub-pixel P6, the polarity of the fifth sub-pixel P5 is different from the polarity of the fourth sub-pixel P4 and the polarity of the sixth sub-pixel P6, the polarity of the fourth sub-pixel P4 is different from the polarity of the first sub-pixel P1, the polarity of the first control electrode CE3 is different from the polarity of the second control electrode CE4, the polarity of the third control electrode CE5 is the same as the polarity of the second control electrode CE4, the polarity of the third control electrode CE8 is different from the polarity of the fourth control electrode CE9, the extending direction of each first slit pattern in each of the first electrodes PE7, PE8, PE9, PE10, PE11, PE12 is different from the extending direction of each second slit pattern in each of the first electrodes PE7, PE8, PE9, PE10, PE11, PE12, and in the first direction D1, the extending directions of the first slit patterns of any two adjacent ones of the first electrodes PE7, PE8, PE9, PE10, PE11, PE12 are different, when the liquid crystal display panel 30 is in the narrow viewing angle display mode, a portion of the liquid crystal molecules driven by the vertical electric field deflect in a clock-wise deflection direction, and another portion of the liquid crystal molecules deflect in a counter-clock wise deflection direction. In this manner, the display brightness presented at the viewing angle on the left side and right side of the normal viewing angle of the liquid crystal display panel 30 is reduced significantly, and thus the double-sided privacy protection effect can be achieved. That is, in the third embodiment, through adjusting the polarity relationship between the third control electrode CE5 and the second control electrode CE4, the liquid crystal display panel 30 can selectively exhibit different display brightness in the viewing angle on both sides of the normal viewing angle under the narrow viewing angle display mode, such that the privacy protection effect at specific viewing angle can be achieved.

For example, when the liquid crystal display panel 30 is in the display mode, and in the condition that the first sub-pixel P1 receives the negative voltage which is 1 V, the second sub-pixel P2 receives the positive voltage which is 9 V, the third sub-pixel P3 receives the negative voltage which is 1 V, the fourth sub-pixel P4 receives the positive voltage which is 9 V, the fifth sub-pixel P5 receives the negative voltage which is 1 V, the sixth sub-pixel P6 receives the positive voltage which is 9 V, the common electrode layer CM receives the common voltage Vcom1 which is 5 V, the first control electrode CE6 receives the positive common voltage Vcom7 which is 8 V, the second control electrode CE7 receives the negative common voltage Vcom8 which is 3 V, the third control electrode CE8 receives the negative common voltage Vcom9 which is 3 V and the fourth control electrode CE9 receives the positive common voltage Vcom10 which is 8 V, a vertical electric field is generated between the first control electrode CE6 and the first electrode PE7 of the first sub-pixel P1 in the first zone Z1, a vertical electric field is generated between the first control electrode CE6 and the first electrode PE9 of the third sub-pixel P3 in the first zone Z1, a vertical electric field is generated between the second control electrode CE7 and the first electrode PE8 of the second sub-pixel P2 in the second zone Z2, a vertical electric field is generated between the fourth control electrode CE9 and the first electrode PE11 of the fifth sub-pixel P5 in the first zone Z1, a vertical electric field is generated between the third control electrode CE8 and the first electrode PE10 of the fourth sub-pixel P4 in the second zone Z2, and a vertical electric field is generated between the third control electrode CE8 and the first electrode PE12 of the sixth sub-pixel P6 in the second zone Z2. Furthermore, since the first electrodes PE9, PE10, PE12 have the same construction as the first electrode PE7, the first electrode PE11 has the same construction as the first electrode PE8, and the included angle between the extending direction of each first slit pattern St7a of the first electrode PE7 in the first zone Z1 and the first direction D1 as well as the included angle between the extending direction of each second slit pattern St8b of the first electrode PE8 in the second zone Z2 and the first direction D1 are negative angles, and the included angle between the extending direction of each second slit pattern St7b of the first electrode PE7 in the second zone Z2 and the first direction D1 as well as the included angle between the extending direction of each first slit pattern St8a of the first electrode PE8 in the first zone Z1 and the first direction D1 are positive angles, the display brightness presented at the viewing angle on both sides of the normal viewing angle of the liquid crystal display panel 30 is reduced significantly. In other words, at this time, the user on both sides of the liquid crystal display panel 30 cannot see the display image clearly and thus the double-sided privacy protection effect can be attained.

Based on the second and the third embodiments, in an embodiment of the invention, with the design that the liquid crystal display panel includes the first sub-pixel, the second sub-pixel and the third sub-pixel arranged in sequence along the first direction in the first sub-pixel row, the first control electrode and the second control electrode overlapping the first sub-pixel, the second sub-pixel and the third sub-pixel, wherein each of the first sub-pixel, the second sub-pixel and the third sub-pixel includes the first electrode having at least one first slit pattern and at least one second slit pattern as well as the first region and the second region arranged in the second direction that intersects the first direction, the at least one first slit pattern and the at least one second slit pattern are respectively located in the first region and the second region, the polarity of the first sub-pixel is the same as the polarity of the third sub-pixel, the polarity of the second sub-pixel is different from the polarity of the first sub-pixel and the polarity of the third sub-pixel, the first control electrode and the second control electrode respectively overlap the first region and the second region, the polarity of the first control electrode is different from the polarity of the second control electrode, the extending direction of the at least one first slit pattern is different from the extending direction of the at least one second slit pattern, and in the first direction, the extending directions of the at least one first slit pattern of any two adjacent ones of the first sub-pixel, the second sub-pixel and the third sub-pixel are different, the liquid crystal display panel is capable of achieving the privacy protection effect at the specific viewing angle.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A liquid crystal display panel, comprising:
a first substrate;
a second substrate, opposite to the first substrate;
a liquid crystal layer, disposed between the first substrate and the second substrate;
a first sub-pixel row, disposed on the first substrate and comprising a first sub-pixel, a second sub-pixel and a third sub-pixel arranged in sequence along a first direction, a polarity of the first sub-pixel being the same as a polarity of the third sub-pixel, a polarity of the second sub-pixel being different from the polarity of the first sub-pixel and the polarity of the third sub-pixel, each of the first sub-pixel, the second sub-pixel and the third sub-pixel having a first region and a second region arranged along a second direction, the first direction intersecting the second direction, and each of the first sub-pixel, the second sub-pixel and the third sub-pixel comprising a first electrode, wherein each of the first electrodes comprises at least one first slit pattern and at least one second slit pattern, the at least one first slit pattern is disposed in the first region, the at least one second slit pattern is disposed in the second region, an extending direction of the at least one first slit pattern is different from an extending direction of the at least one second slit pattern, and in the first direction, extending directions of the at least one first slit pattern of two adjacent first electrodes are different;
a first control electrode, disposed on the second substrate and overlapping the first region of the first sub-pixel, the first region of the second sub-pixel and the first region of the third sub-pixel; and
a second control electrode, disposed on the second substrate and overlapping the second region of the first sub-pixel, the second region of the second sub-pixel and the second region of the third sub-pixel, wherein a polarity of the first control electrode is different from a polarity of the second control electrode.

2. The liquid crystal display panel according to claim 1, further comprising:
a second sub-pixel row, disposed on the first substrate and comprising a fourth sub-pixel, a fifth sub-pixel and a sixth sub-pixel arranged in sequence along the first direction, a polarity of the fourth sub-pixel being the same as a polarity of the sixth sub-pixel, a polarity of the fifth sub-pixel being different from the polarity of the fourth sub-pixel and the polarity of the sixth sub-pixel, each of the fourth sub-pixel, the fifth sub-pixel and the sixth sub-pixel comprising the first region and the second region, and each of the fourth sub-pixel, the fifth sub-pixel and the sixth sub-pixel comprising the first electrode, wherein
the fourth sub-pixel and the first sub-pixel are arranged in the second direction, and the polarity of the fourth sub-pixel is different from the polarity of the first sub-pixel.

3. The liquid crystal display panel according to claim 2, further comprising:
a third control electrode, disposed on the second substrate and overlapping the second region of the fourth sub-pixel, the second region of the fifth sub-pixel and the second region of the sixth sub-pixel.

4. The liquid crystal display panel according to claim 3, wherein a polarity of the third control electrode is different from the polarity of the second control electrode.

5. The liquid crystal display panel according to claim 3, wherein the second control electrode further overlaps the first region of the fourth sub-pixel, the first region of the fifth sub-pixel and the first region of the sixth sub-pixel.

6. The liquid crystal display panel according to claim 3, further comprising:
a fourth control electrode, disposed on the second substrate and overlapping the first region of the fourth sub-pixel, the first region of the fifth sub-pixel and the first region of the sixth sub-pixel, wherein a polarity of the third control electrode is different from a polarity of the fourth control electrode.

7. The liquid crystal display panel according to claim 2, wherein an included angle between the extending direction of the at least one first slit pattern and the first direction is larger than 0 degree and smaller than or equal to 45 degrees, and an included angle between the extending direction of the at least one second slit pattern and the first direction is larger than 0 degree and smaller than or equal to 45 degrees.

8. The liquid crystal display panel according to claim 2, wherein each of the first electrodes comprises:
a frame;
at least two first branches, connected with the frame and disposed in the first region, wherein each of the first slit patterns is formed between two of the adjacent first branches; and
at least two second branches, connected with the frame and disposed in the second region, wherein each of the second slit patterns is formed between two adjacent second branches.

9. The liquid crystal display panel according to claim 2, wherein each of the first sub-pixel, the second sub-pixel, the third sub-pixel, the fourth sub-pixel, the fifth sub-pixel and the sixth sub-pixel further comprises:
an active element; and
a second electrode, structurally separated from the first electrode, and one of the first electrode and the second electrode is electrically connected with the active element.

10. A liquid crystal display panel, comprising:
a first substrate;
a second substrate, opposite to the first substrate;
a liquid crystal layer, disposed between the first substrate and the second substrate;
a first sub-pixel row, disposed on the first substrate and comprising a first sub-pixel, a second sub-pixel and a third sub-pixel arranged in sequence along a first direction, a polarity of the first sub-pixel being the same as a polarity of the third sub-pixel, a polarity of the second sub-pixel being different from the polarity of the first sub-pixel and the polarity of the third sub-pixel, and each of the first sub-pixel, the second sub-pixel and the third sub-pixel comprising a first electrode, wherein each of the first electrodes comprises at least one slit pattern, and in the first direction, extending directions of the at least one slit pattern of two adjacent first electrodes are different;
a second sub-pixel row, disposed on the first substrate and comprising a fourth sub-pixel, a fifth sub-pixel and a sixth sub-pixel arranged in sequence along the first direction, a polarity of the fourth sub-pixel being the same as a polarity of the sixth sub-pixel, a polarity of the fifth sub-pixel being different from the polarity of the fourth sub-pixel and the polarity of the sixth sub-pixel, and each of the fourth sub-pixel, the fifth sub-pixel and the sixth sub-pixel comprising the first electrode, wherein the fourth sub-pixel and the first sub-pixel are arranged along a second direction, the first direction intersects the second direction, and the polarity of the fourth sub-pixel is different from the polarity of the first sub-pixel;
a first control electrode, disposed on the second substrate and overlapping the first sub-pixel, the second sub-pixel and the third sub-pixel; and
a second control electrode, disposed on the second substrate and overlapping the fourth sub-pixel, the fifth sub-pixel and the sixth sub-pixel, wherein a polarity of the first control electrode is different from a polarity of the second control electrode.

11. The liquid crystal display panel according to claim 10, wherein an included angle between the extending direction of the at least one first slit pattern and the first direction is larger than 0 degree and smaller than or equal to 45 degrees.

12. The liquid crystal display panel according to claim 10, wherein each of the first electrodes comprises:
   a frame; and
   at least two branches, connected with the frame, wherein each of the slit patterns is formed between two of the adjacent branches.

13. The liquid crystal display panel according to claim 10, wherein an included angle between the extending direction of the at least one first slit pattern and the first direction is larger than 0 degree and smaller than or equal to 45 degrees, and wherein each of the first sub-pixel, the second sub-pixel, the third sub-pixel, the fourth sub-pixel, the fifth sub-pixel and the sixth sub-pixel further comprises:
   an active element; and
   a second electrode, structurally separated from the first electrode, and one of the first electrode and the second electrode is electrically connected with the active element.

\* \* \* \* \*